United States Patent
Inoue et al.

(10) Patent No.: US 11,161,547 B2
(45) Date of Patent: Nov. 2, 2021

(54) PARKING ASSISTANCE DEVICE

(71) Applicant: Mitsubishi Electric Corporation, Tokyo (JP)

(72) Inventors: Satoru Inoue, Tokyo (JP); Shinichi Harase, Tokyo (JP); Ryotaro Suzuki, Tokyo (JP); Wataru Tsujita, Tokyo (JP); Tsutomu Asahina, Tokyo (JP); Yoshitsugu Sawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 330 days.

(21) Appl. No.: 16/324,659

(22) PCT Filed: Sep. 9, 2016

(86) PCT No.: PCT/JP2016/076623
§ 371 (c)(1),
(2) Date: Feb. 11, 2019

(87) PCT Pub. No.: WO2018/047295
PCT Pub. Date: Mar. 15, 2018

(65) Prior Publication Data
US 2019/0217856 A1 Jul. 18, 2019

(51) Int. Cl.
*B62D 15/02* (2006.01)
*G01S 15/93* (2020.01)
(Continued)

(52) U.S. Cl.
CPC .......... *B62D 15/0285* (2013.01); *B60R 21/00* (2013.01); *B60W 30/06* (2013.01);
(Continued)

(58) Field of Classification Search
CPC ... B62D 15/0285; B62D 15/027; G01S 15/93; G01S 15/931; G01S 2015/932;
(Continued)

(56) References Cited

U.S. PATENT DOCUMENTS 10,814,863 B2 * 10/2020 Kim .................. B60W 30/06
2006/0245653 A1 * 11/2006 Camus et al. ..... G06K 9/00805
382/199
(Continued)

FOREIGN PATENT DOCUMENTS

JP 2008-546577 A 12/2008
JP 2014-074665 A 4/2014
(Continued)

OTHER PUBLICATIONS

Notice of Reasons for Refusal issued in corresponding Japanese Application No. 2018-537948 dated May 31, 2019.
(Continued)

*Primary Examiner* — Dale W Hilgendorf
(74) *Attorney, Agent, or Firm* — Birch, Stewart, Kolasch & Birch, LLP

(57) ABSTRACT

A parking assistance device includes a pair of left and right sonar devices provided in a vehicle, an obstacle detection controller for determining whether an obstacle present within a determination target distance range on a side of the vehicle is a wall or a curb by comparing a level value of a reflection wave received by one of the sonar devices with each of a first threshold value and a second threshold value that are different from each other, and an automatic parking controller for setting a guiding route for automatic parking depending on a determination result, and the automatic parking controller sets the guiding route requiring a large amount of steering of the vehicle in a case where the determination result indicates a curb, compared with a case where the determination result indicates a wall in the automatic parking in the form of parallel parking.

3 Claims, 22 Drawing Sheets

(51) Int. Cl.
  *G08G 1/16* (2006.01)
  *B60R 21/00* (2006.01)
  *B60W 30/06* (2006.01)
  *G01S 15/931* (2020.01)
  *G06K 9/00* (2006.01)
(52) U.S. Cl.
  CPC ............ *B62D 15/027* (2013.01); *G01S 15/93* (2013.01); *G01S 15/931* (2013.01); *G06K 9/00805* (2013.01); *G08G 1/16* (2013.01); *G01S 2015/932* (2013.01)
(58) Field of Classification Search
  CPC ......... G08G 1/16; B60R 21/00; B60W 30/06; G06K 9/00805
  See application file for complete search history.

(56) References Cited

U.S. PATENT DOCUMENTS

| | | | |
|---|---|---|---|
| 2010/0039292 A1 | 2/2010 | Scherl et al. | |
| 2015/0219760 A1* | 8/2015 | Hiramaki et al. ... | B62D 15/027 367/99 |
| 2016/0075327 A1* | 3/2016 | Kiyokawa et al. .......................... | B62D 15/0285 701/301 |
| 2017/0028984 A1* | 2/2017 | Kiyokawa et al. .......................... | B62D 15/0285 |
| 2017/0028985 A1* | 2/2017 | Kiyokawa .......... | B62D 15/0285 |
| 2017/0300062 A1* | 10/2017 | Kim ................... | B62D 15/0285 |
| 2019/0073902 A1* | 3/2019 | Indoh et al. ....... | B62D 15/0285 |

FOREIGN PATENT DOCUMENTS

| | | |
|---|---|---|
| JP | 2014-101101 A | 6/2014 |
| JP | 2014-157501 A | 8/2014 |
| WO | WO 2014/083787 A1 | 5/2014 |

OTHER PUBLICATIONS

International Search Report for PCT/JP2016/076623 (PCT/ISA/210) dated Nov. 15, 2016.

Chinese Office Action and Search Report for Chinese Application No. 201680088967.7. dated Mar. 3, 2021, with English translation of the Office Action.

* cited by examiner

FIG. 5

| Reflection Position Having Level Value Larger Than or Equal to First Threshold Value (First Reflection Position) | Included | Included |
|---|---|---|
| Reflection Position Having Level Value Larger Than or Equal to Second Threshold Value (Second Reflection Position) | None | Included |
| Type of Obstacle | Curb | Wall |

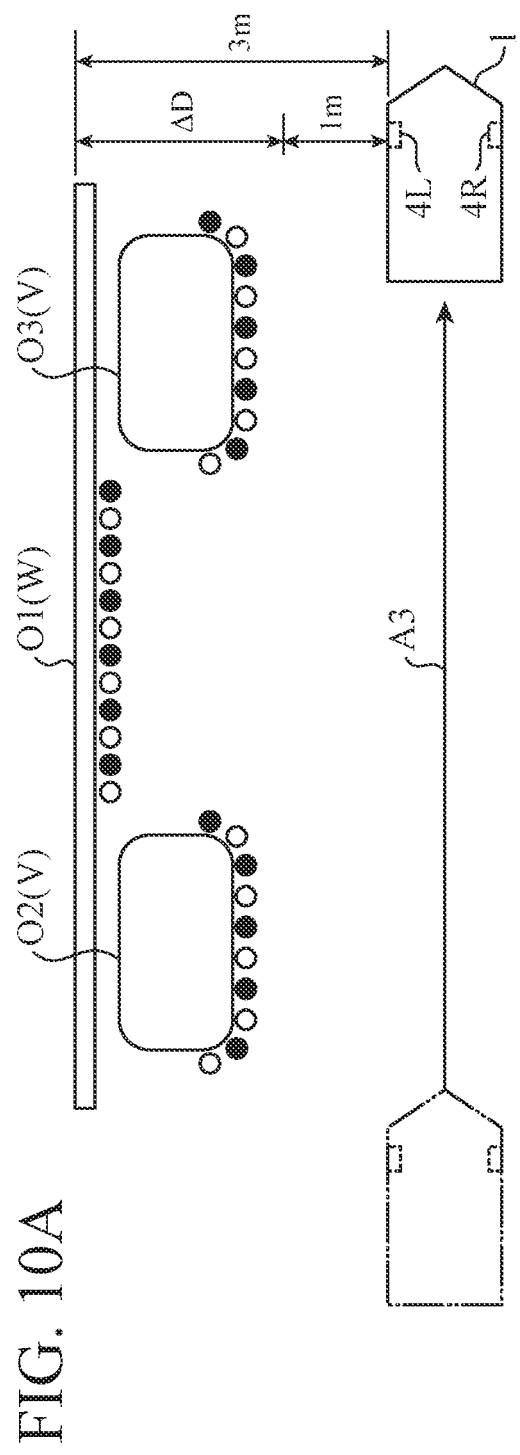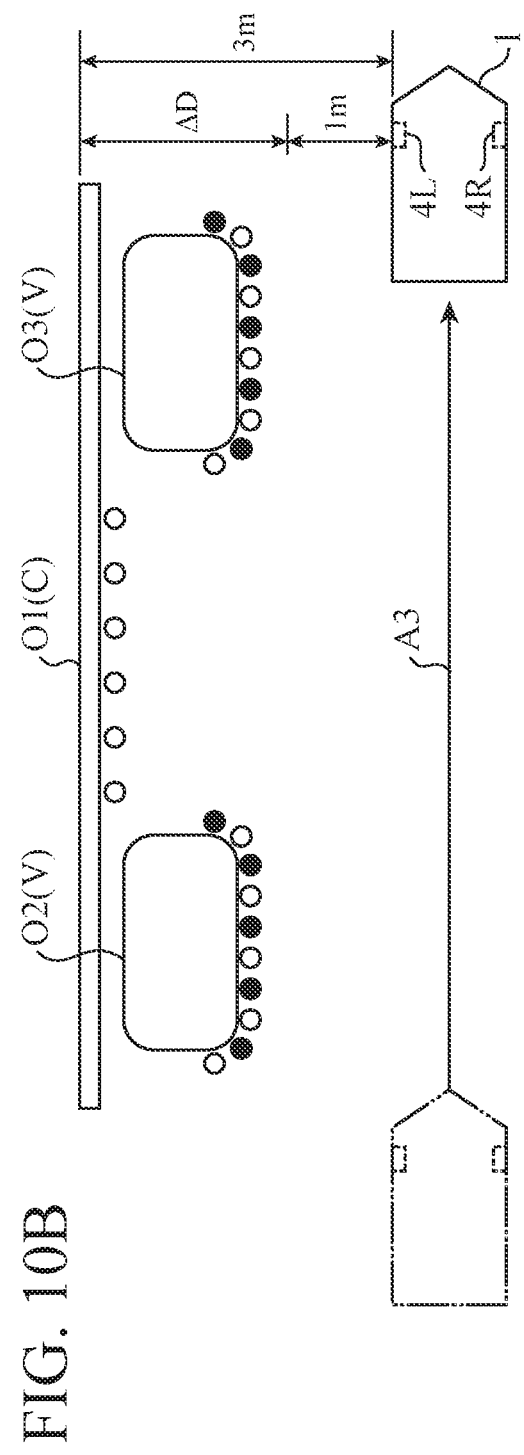

FIG. 14A

| | | | | |
|---|---|---|---|---|
| Reflection Position Having Level Value Larger Than or Equal to First Threshold Value (First Reflection Position) | Included | Included | Included | Included |
| Reflection Position Having Level Value Larger Than or Equal to Second Threshold Value (Second Reflection Position) | None | Included | Included | Included |
| Value Indicating Variation in Direction Indicated by Normal Vectors | Small | Small | Medium | Large |
| Type of Obstacle | Curb | Wall | Another Vehicle (Parallel Parking) | Another Vehicle (Double Parking) |

FIG. 14B

| | | | | |
|---|---|---|---|---|
| Reflection Position Having Level Value Larger Than or Equal to First Threshold Value (First Reflection Position) | Included | Included | Included | Included |
| Reflection Position Having Level Value Larger Than or Equal to Second Threshold Value (Second Reflection Position) | None | Included | Included | Included |
| Value Indicating Variation in Direction Along Inter-Reflection Position Lines | Small | Small | Medium | Large |
| Type of Obstacle | Curb | Wall | Another Vehicle (Parallel Parking) | Another Vehicle (Double Parking) |

FIG. 14C

| | | | | |
|---|---|---|---|---|
| Reflection Position Having Level Value Larger Than or Equal to First Threshold Value (First Reflection Position) | Included | Included | Included | Included |
| Reflection Position Having Level Value Larger Than or Equal to Second Threshold Value (Second Reflection Position) | None | Included | Included | Included |
| Value Indicating Variation in Angle Formed by Reference Direction And Inter-Reflection Position Lines | Small | Small | Medium | Large |
| Type of Obstacle | Curb | Wall | Another Vehicle (Parallel Parking) | Another Vehicle (Double Parking) |

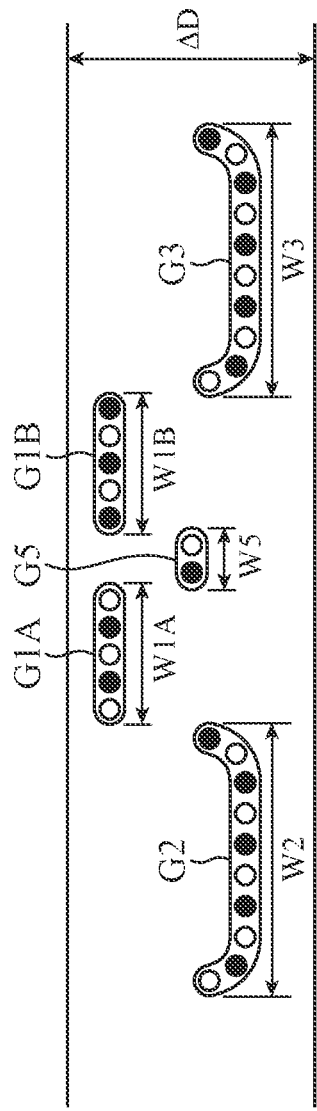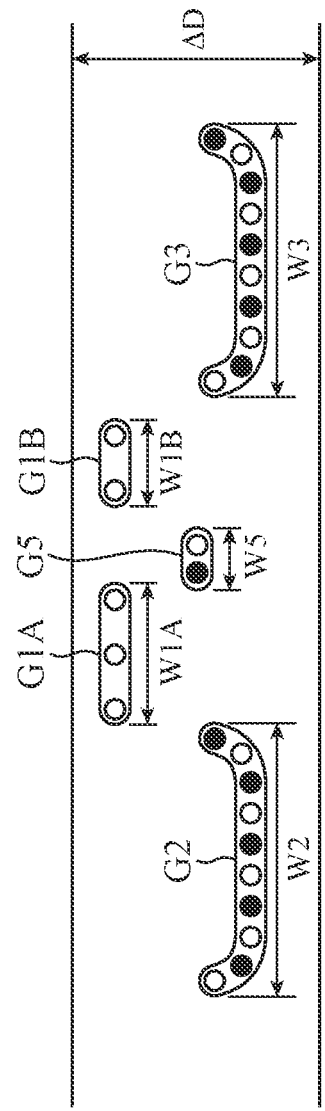
FIG. 22A
FIG. 22B

FIG. 23

| Reflection Position Having Level Value Larger Than or Equal to First Threshold Value (First Reflection Position) | Included | Included | Included |
|---|---|---|---|
| Reflection Position Having Level Value Larger Than or Equal to Second Threshold Value (Second Reflection Position) | None | Included | Included |
| Width of Group | Wide | Wide | Wide |
| Type of Obstacle | Curb | Wall or Vehicle | Pole |

FIG. 24A

| Reflection Position Having Level Value Larger Than or Equal to First Threshold Value (First Reflection Position) | Included | Included | Included |
|---|---|---|---|
| Reflection Position Having Level Value Larger Than or Equal to Second Threshold Value (Second Reflection Position) | Included | Included | Included |
| Value Indicating Variation in Direction Indicated by Normal Vectors | Small | Medium | Large |
| Type of Obstacle | Wall | Another Vehicle (Parallel Parking) | Another Vehicle (Double Parking) |

FIG. 24B

| Reflection Position Having Level Value Larger Than or Equal to First Threshold Value (First Reflection Position) | Included | Included | Included |
|---|---|---|---|
| Reflection Position Having Level Value Larger Than or Equal to Second Threshold Value (Second Reflection Position) | Included | Included | Included |
| Value Indicating Variation in Direction Along Inter-Reflection Position Lines | Small | Medium | Large |
| Type of Obstacle | Wall | Another Vehicle (Parallel Parking) | Another Vehicle (Double Parking) |

FIG. 24C

| Reflection Position Having Level Value Larger Than or Equal to First Threshold Value (First Reflection Position) | Included | Included | Included |
|---|---|---|---|
| Reflection Position Having Level Value Larger Than or Equal to Second Threshold Value (Second Reflection Position) | Included | Included | Included |
| Value Indicating Variations in Angle Formed by Reference Direction And Inter-Reflection Position Lines | Small | Medium | Large |
| Type of Obstacle | Wall | Another Vehicle (Parallel Parking) | Another Vehicle (Double Parking) |

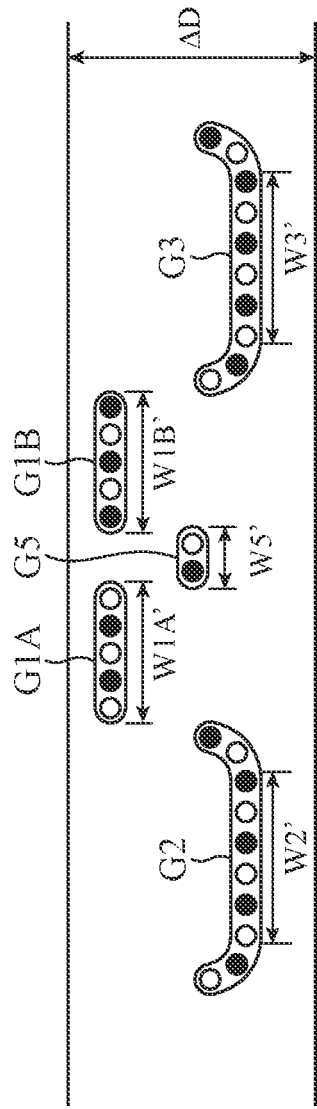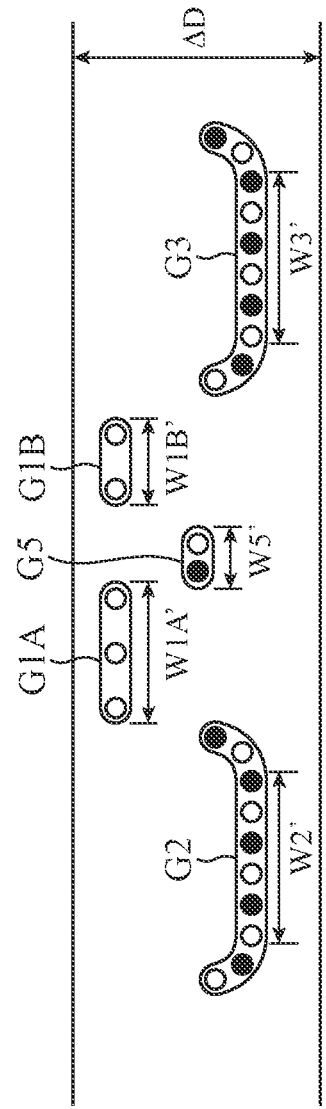

PARKING ASSISTANCE DEVICE

TECHNICAL FIELD

The present invention relates to a parking assistance device.

BACKGROUND ART

A so-called "automatic parking" technique has been developed for automatically controlling a steering or other parts of a vehicle when the vehicle is parked. In addition, in automatic parking, a technique has been developed for detecting an obstacle present in the vicinity of a vehicle by using a sonar device provided in the vehicle and setting a guiding route avoiding the obstacle.

For example, in a vehicle V of Patent Literature 1, a pair of left and right Fr sonar devices 31 is attached to front parts of vehicle side parts, and a pair of left and right Rr sonar devices 32 is attached to rear parts of the vehicle side parts. A detectable range of the Rr sonar devices 32 is set lower than a detectable range of the Fr sonar devices 31. By using the Fr sonar devices 31 and the Rr sonar devices 32, that are, two sonar devices provided on each side of the vehicle V, an ECU 10 detects obstacles that cannot be crossed over such as other vehicles Va and Vb and a pillar F as well as low obstacles that can be crossed over such as curbs E and E1. Using detection results of the Fr sonar devices 31 and the Rr sonar devices 32, the ECU 10 executes automatic parking as illustrated in FIG. 6 of Patent Literature 1 (see FIGS. 1, 2, and 6 of Patent Literature 1).

CITATION LIST

Patent Literature

Patent Literature 1: JP 2014-101101 A

SUMMARY OF INVENTION

Technical Problem

Patent Literature 1 describes automatic parking in a case where there is a curb in the back of another vehicle in parallel parking (see para. [0045] and FIG. 6D of Patent Literature 1). However, obstacles present in the back of another vehicle in parallel parking are not limited to curbs, and there may be an obstacle that cannot be crossed over such as a wall. When automatic parking is performed with a guiding route similar to that for a situation where there is a curb in the back of the other vehicle, when there is a wall in the back of the other vehicle, there is a possibility that the corner of the vehicle comes into contact with the wall. As described above, there is a problem in the parking assistance device of Patent Literature 1 that when executing automatic parking in the form of parallel parking, it is not possible to set an appropriate guiding route depending on whether an obstacle is a curb or a wall.

In addition, the parking assistance device of Patent Literature 1 detects obstacles and low obstacles by using the two sonar devices provided on each side of the vehicle, that is, a total of four sonar devices. From the viewpoint of avoiding interference between the Fr sonar devices and the Rr sonar devices, this configuration requires to form large intervals in the arrangement of the Fr sonar devices and the Rr sonar devices, that is, to arrange the Fr sonar devices and the Rr sonar devices shifted from each other in the front-rear direction of the vehicle. For this reason, as for parallel parking or double parking based on automatic parking, there is a problem that a travel distance required for detection is extended when an obstacle or a low obstacle present on sides of the vehicle is detected while the vehicle travels at a low speed. There is also another problem that the detection precision is low since a detection timing by an Fr sonar device and a detection timing by an Rr sonar device are shifted for the same obstacle or low obstacle.

The present invention has been made to solve the problems as described above, and it is an object of the present invention to provide a parking assistance device capable of setting an appropriate guiding route depending on whether an obstacle is a curb or a wall in executing automatic parking in the form of parallel parking.

Solution to Problem

A parking assistance device of the present invention includes: a pair of left and right sonar devices provided in a vehicle; an obstacle detection controller to determine whether an obstacle present within a determination target distance range on a side of the vehicle is a wall or a curb by comparing a level value of a reflection wave received by one of the sonar devices with each of a first threshold value and a second threshold value that are different from each other; and an automatic parking controller to set a guiding route for automatic parking depending on a determination result by the obstacle detection controller, in which the automatic parking controller sets the guiding route requiring a large amount of steering of the vehicle in a case where the determination result indicates a curb, with respect to a case where the determination result indicates a wall in the automatic parking in the form of parallel parking.

Advantageous Effects of Invention

A parking assistance device of the present invention is capable of setting an appropriate guiding route depending on whether an obstacle is a curb or a wall in executing automatic parking in the form of parallel parking.

BRIEF DESCRIPTION OF DRAWINGS

FIG. 5 is an explanatory diagram illustrating a table corresponding to a determination method by a type determining unit according to the first embodiment of the present invention.

FIG. 10A is an explanatory diagram illustrating reflection positions calculated by a reflection position calculating unit according to the second embodiment of the present invention. FIG. 10B is an explanatory diagram illustrating other reflection positions calculated by the reflection position calculating unit according to the second embodiment of the present invention.

FIG. 14A is an explanatory diagram illustrating a table corresponding to a determination method by a type determining unit according to the second embodiment of the present invention. FIG. 14B is an explanatory diagram illustrating another table corresponding to the determination method by the type determining unit according to the second embodiment of the present invention. FIG. 14C is an explanatory diagram illustrating still another table corresponding to the determination method by the type determining unit according to the second embodiment of the present invention.

FIG. 22A is an explanatory diagram illustrating groups set by a grouping processing unit according to the third embodiment of the present invention. FIG. 22B is an explanatory diagram illustrating other groups set by the grouping processing unit according to the third embodiment of the present invention.

FIG. 23 is an explanatory diagram illustrating a table corresponding to a determination method by a type determining unit according to the third embodiment of the present invention.

FIG. 24A is an explanatory diagram illustrating another table corresponding to a determination method by the type determining unit according to the third embodiment of the present invention. FIG. 24B is an explanatory diagram illustrating another table corresponding to the determination method by the type determining unit according to the third embodiment of the present invention. FIG. 24C is an explanatory diagram illustrating still another table corresponding to the determination method by the type determining unit according to the third embodiment of the present invention.

FIG. 25A is an explanatory diagram illustrating still other groups set by the grouping processing unit according to the third embodiment of the present invention. FIG. 25B is an explanatory diagram illustrating yet other groups set by the grouping processing unit according to the third embodiment of the present invention.

DESCRIPTION OF EMBODIMENTS

To describe the present invention further in detail, embodiments for carrying out the present invention will be described below with reference to accompanying drawings.

First Embodiment

Figure 1:
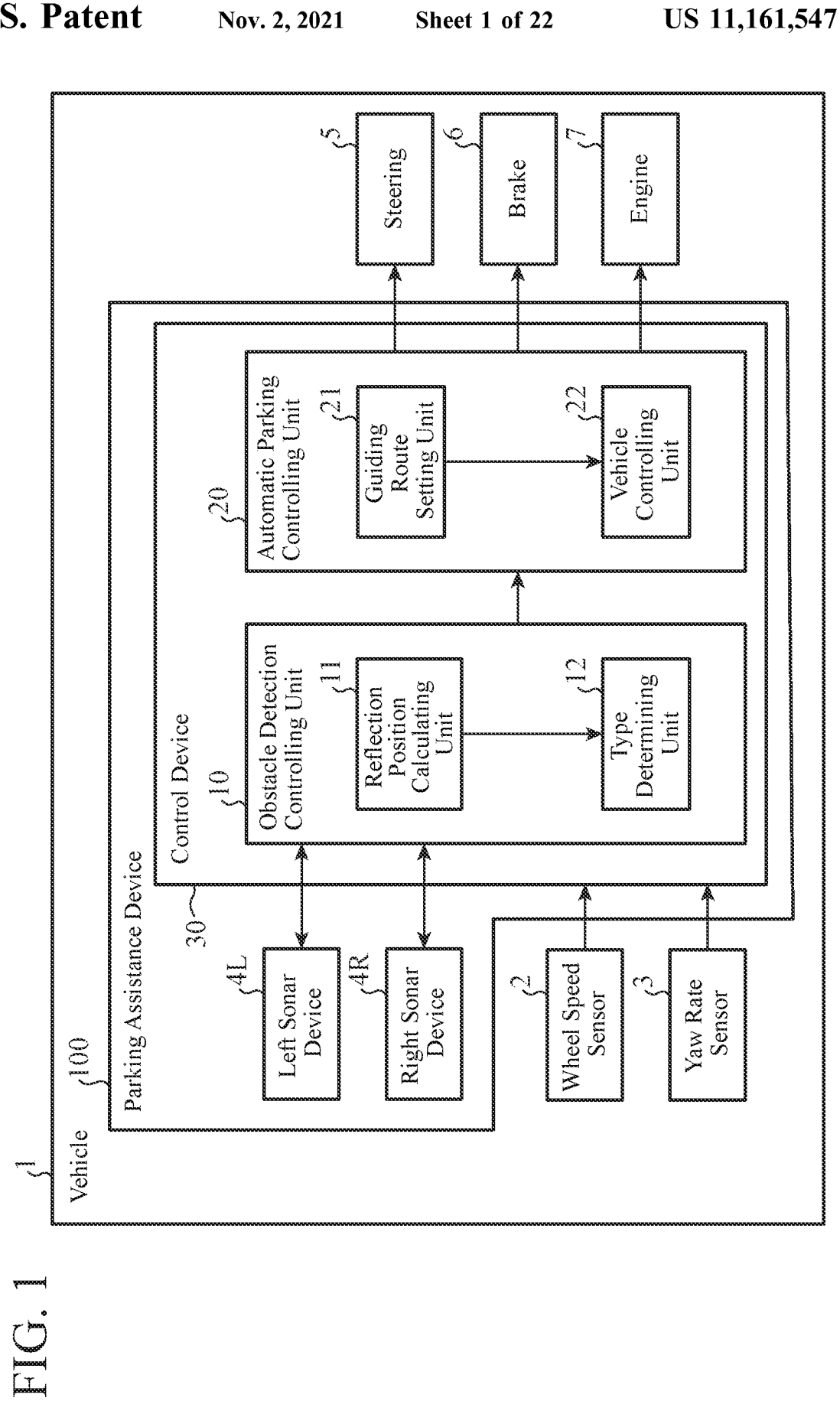
FIG. 1 is a functional block diagram illustrating a parking assistance device according to a first embodiment of the present invention mounted on a vehicle.

FIG. 1 is a functional block diagram illustrating a parking assistance device according to a first embodiment of the present invention mounted on a vehicle. With reference to FIG. 1, a parking assistance device 100 according to the first embodiment will be described with a focus on an exemplary application in which the parking assistance device is used in a vehicle 1 constituting a four-wheeled vehicle.

A wheel speed sensor 2 detects the rotation speed of the wheels of the vehicle 1 and outputs a signal indicating the rotation speed. A yaw rate sensor 3 detects the yaw rate of the vehicle 1 and outputs a signal indicating the yaw rate.

A left sonar device 4L is configured by a single ultrasonic sensor provided, for example, in the front half of the left side part of the vehicle 1. A right sonar device 4R is configured by a single ultrasonic sensor provided, for example, in the front half of the right side part of the vehicle 1. Hereinafter, the left sonar device 4L and the right sonar device 4R may be collectively referred to simply as "sonar devices" in some cases. The sonar devices 4L and 4R emit ultrasonic waves toward the sides of the vehicle 1 and receive the ultrasonic waves reflected by obstacles present on the sides of the vehicle 1 (hereinafter referred to as "reflection waves").

Figure 2A:
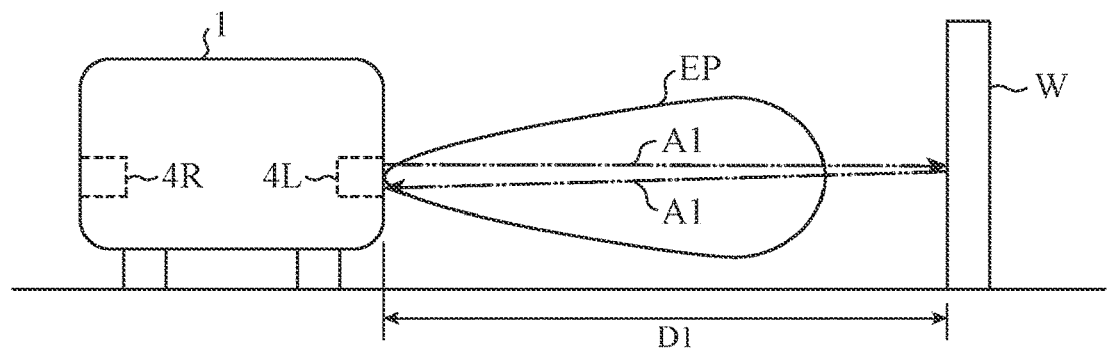
FIG. 2A is an explanatory diagram illustrating a radiation pattern of an ultrasonic wave by a left sonar device according to the first embodiment of the present invention and a route of the ultrasonic wave reflected by a wall.
Figure 2B:
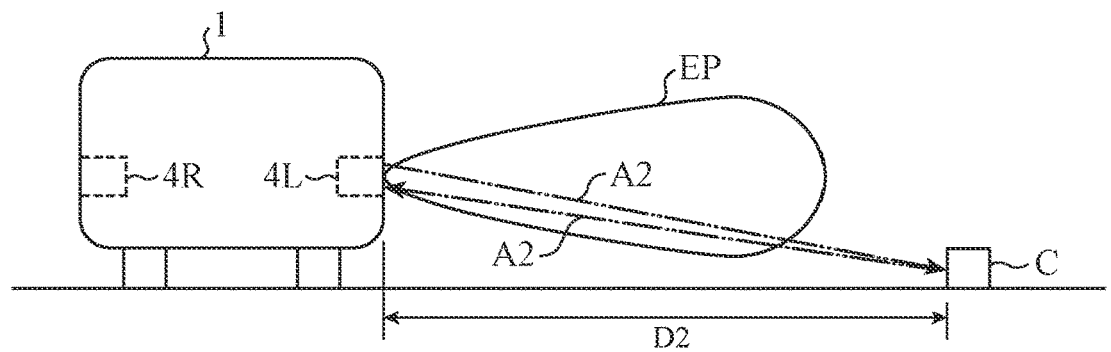
FIG. 2B is an explanatory diagram illustrating a radiation pattern of an ultrasonic wave by a left sonar device according to the first embodiment of the present invention and a route of the ultrasonic wave reflected by a curb.

FIG. 2 illustrates an example of a radiation pattern EP of an ultrasonic wave by the left sonar device 4L. As illustrated in FIG. 2, the left sonar device 4L has a directivity oriented along the horizontal direction. When a wall W is present on the left of the vehicle 1, an arrow A1 in FIG. 2A illustrates a route of the ultrasonic wave emitted by the left sonar device 4L and reflected by the wall W. This route extends along the orientation of the left sonar device 4L. When a curb C is present on the left of the vehicle 1, an arrow A2 in FIG. 2B illustrates a route of the ultrasonic wave emitted by the left sonar device 4L and reflected by the curb C. The route is shifted downward with respect to the orientation of the left sonar device 4L. Therefore, in a case where a distance D2 between the vehicle 1 and the curb C and a distance D1 between the vehicle 1 and the wall W have equivalent values, a level value of the reflection wave reflected by the curb C is smaller than a level value of the reflection wave reflected by the wall W.

Note that the right sonar device 4R has a directivity similar to that of the left sonar device 4L, and a radiation pattern of an ultrasonic wave by the right sonar device 4R is similar to the radiation pattern EP illustrated in FIG. 2. Therefore, illustration and explanation of the radiation pattern of the ultrasonic wave and other features of the right sonar device 4R are omitted.

Figure 3:
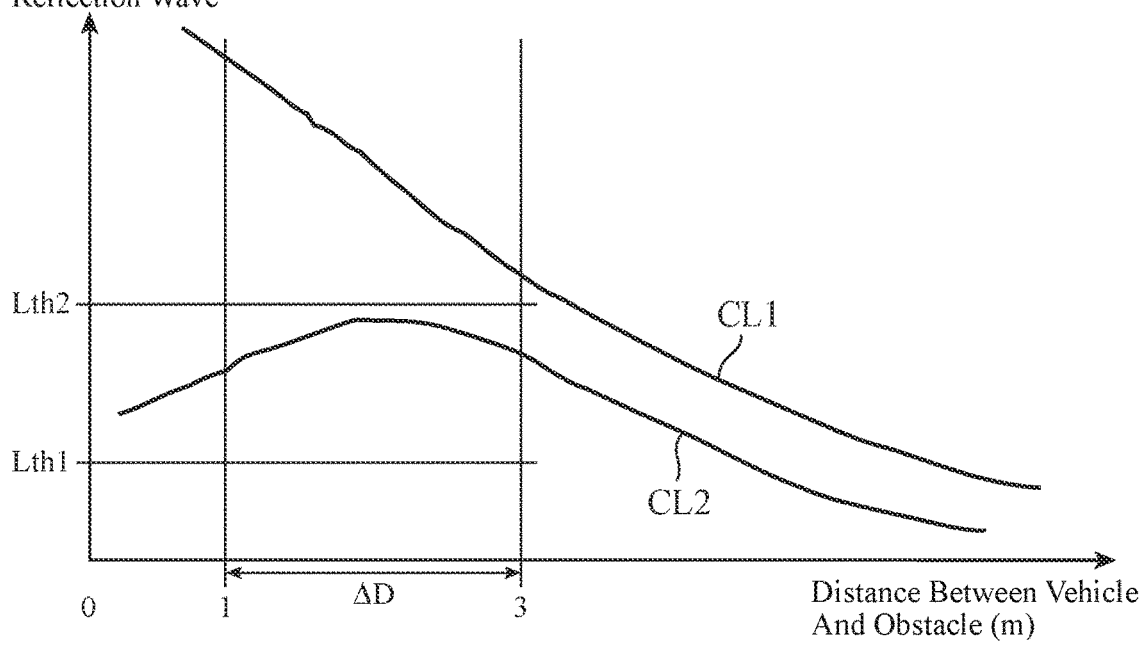
FIG. 3 is a characteristic graph illustrating the level value of reflection waves with respect to the distance between a vehicle and an obstacle.

FIG. 3 is a characteristic graph in which the distance between the vehicle 1 and an obstacle present on a side of the vehicle 1 is represented in the horizontal axis and the level value of a reflection wave reflected by an obstacle and received by the sonar device 4L or 4R is represented in the vertical axis. A characteristic line CL1 in FIG. 3 represents the level value of a reflection wave reflected by the wall W. The level value of a reflection wave reflected by the wall W gradually decreases as the distance between the vehicle 1 and the wall W increases. Moreover, a characteristic line CL2 in FIG. 3 represents the level value of the reflection wave reflected by the curb C. The level value of the reflection wave reflected by the curb C is smaller than the level value of the reflection wave reflected by the wall W over substantially the entire distance range.

Here, the characteristic line CL2 has a peak of level values at a position where the distance between the vehicle 1 and the curb C is approximately 2 meters, unlike the characteristic line CL1. This is because, as the distance between the vehicle 1 and the curb C decreases, a deviation between the orientation of the sonar device 4L or 4R and a route of an ultrasonic wave (that is, a route corresponding to the arrow A2 illustrated in FIG. 2B) gradually increases, and the curb C leaves out of a detectable area of the sonar device 4L or 4R. As a result, within a predetermined distance range (a distance range of 1 to 3 meters in the example of FIG. 3) ΔD including the peak of the characteristic line CL2, the level value of the reflection wave reflected by the curb C is greater than or equal to Lth1 and less than Lth2, and the level value of the reflection wave reflected by the wall W is greater than or equal to Lth2. The value Lth1 illustrated in FIG. 3 corresponds to a first threshold value set in a reflection position calculating unit 11. The value Lth2 illustrated in FIG. 3 corresponds to a second threshold value set in a reflection position calculating unit 11.

Using the first threshold value Lth1, the reflection position calculating unit 11 executes processing (hereinafter referred to as "first reflection position calculating processing") for calculating a position at which the ultrasonic wave transmitted by the sonar device 4L or 4R has been reflected (hereinafter referred to as "reflection position"). That is, the reflection position calculating unit 11 causes the sonar device 4L or 4R to transmit an ultrasonic wave. When the sonar device 4L or 4R receives a reflection wave a level value of which is greater than or equal to the first threshold value Lth1, the reflection position calculating unit 11 calculates the reciprocating propagation distance of the ultrasonic wave by multiplying the time from transmission of the ultrasonic wave by the sonar device 4L or 4R to reception of the reflection wave by the sonar device 4L or 4R and the propagation speed of the ultrasonic wave. The reflection position calculating unit 11 further calculates the position of the vehicle 1 (hereinafter referred to as "host vehicle position") at the time when the sonar device 4L or 4R has transmitted and received the ultrasonic wave using output signals of the wheel speed sensor 2 and the yaw rate sensor 3. The reflection position calculating unit 11 calculates the reflection position using the reciprocating propagation distance and the host vehicle position. Specifically, for example, the reflection position calculating unit 11 sets, as the reflection position, a position away from the host vehicle position by a distance of a half the reciprocating propagation distance in a direction toward the side of the vehicle 1, or calculates the reflection position by so-called "aperture synthesis processing." Hereinafter, the reflection position calculated by the first reflection position calculating processing may be referred to as a "first reflection position."

Moreover, the reflection position calculating unit 11 executes processing for calculating a reflection position using the second threshold value Lth2 (hereinafter referred to as "second reflection position calculating processing"). That is, the reflection position calculating unit 11 causes the sonar device 4L or 4R to transmit an ultrasonic wave. When the sonar device 4L or 4R receives a reflection wave a level value of which is greater than or equal to the second threshold value Lth2, the reflection position calculating unit 11 calculates the reciprocating propagation distance of the ultrasonic wave by multiplying the time from transmission of the ultrasonic wave by the sonar device 4L or 4R to reception of the reflection wave by the sonar device 4L or 4R and the propagation speed of the ultrasonic wave. The reflection position calculating unit 11 further calculates the host vehicle position at the time when the sonar device 4L or 4R has transmitted and received the ultrasonic wave using output signals of the wheel speed sensor 2 and the yaw rate sensor 3. The reflection position calculating unit 11 calculates the reflection position using the reciprocating propagation distance and the host vehicle position. Specifically, for example, the reflection position calculating unit 11 sets, as the reflection position, a position away from the host vehicle position by a distance of a half the reciprocating propagation distance in a direction toward the side of the vehicle 1, or calculates the reflection position by the aperture synthesis processing. Hereinafter, the reflection position calculated by the second reflection position calculating processing may be referred to as a "second reflection position."

The reflection position calculating unit 11 is configured to execute the first reflection position calculating processing and the second reflection position calculating processing at different timing. Specifically, for example, when a vehicle controlling unit 22 described later executes automatic parking in the form of parallel parking, the reflection position calculating unit 11 executes the first reflection position calculating processing and the second reflection position calculating processing alternately and repeatedly when the vehicle 1 is travelling at a speed lower than or equal to a predetermined reference speed (for example, 10 km/h).

FIG. 4 is a diagram illustrating an example of reflection positions calculated by the reflection position calculating unit 11. In the figure, a white dot indicates a first reflection position and a black dot indicates a second reflection position. An arrow A3 indicates a traveling route of the vehicle 1 at a speed lower than or equal to the reference speed. A distance range ΔD in FIG. 4 indicates a distance range similar to the distance range ΔD in FIG. 3.

Figure 4A:
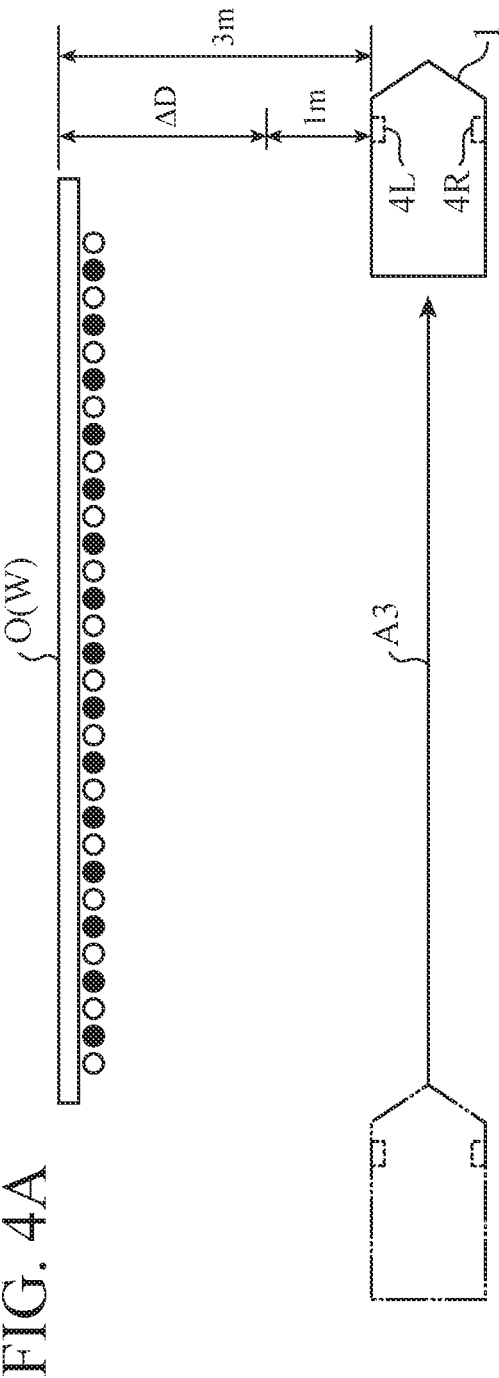
FIG. 4A is an explanatory diagram illustrating reflection positions calculated by a reflection position calculating unit according to the first embodiment of the present invention.

As illustrated in FIG. 4A, in a case where an obstacle O present in the distance range ΔD is a wall W, first reflection positions and second reflection positions are alternately arranged along the obstacle O. That is, as described with reference to FIG. 3, since the level value of the reflection wave reflected by the wall W present within the distance range ΔD is a value greater than or equal to the second threshold value Lth2, reflection positions are calculated by both the first reflection position calculating processing and the second reflection position calculating processing.

Figure 4B:
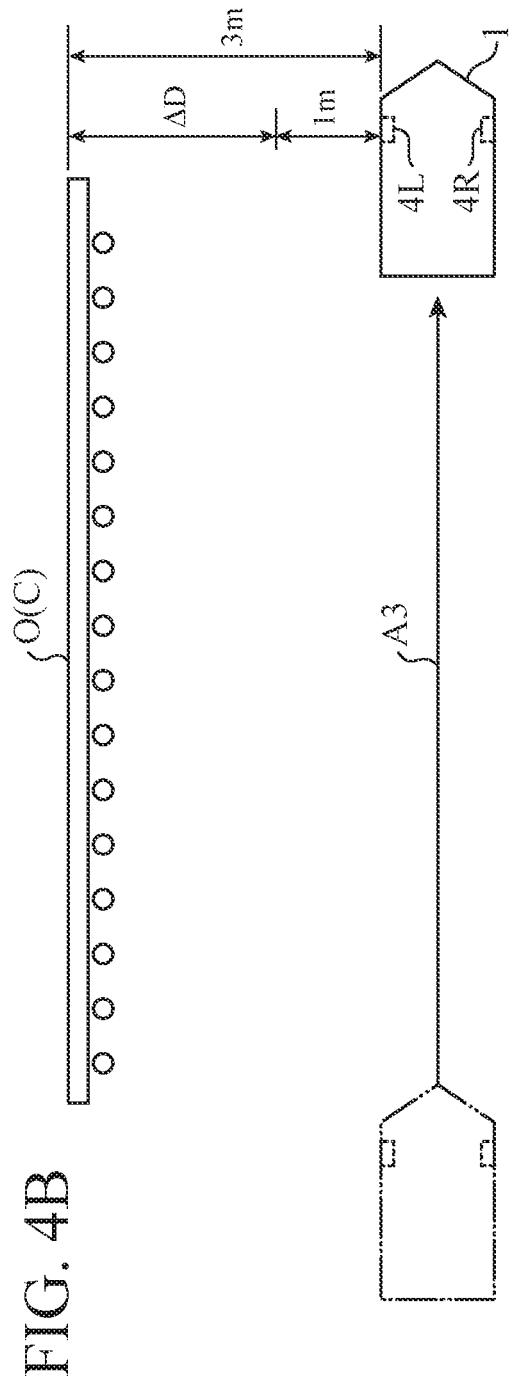
FIG. 4B is an explanatory diagram illustrating other reflection positions calculated by the reflection position calculating unit according to the first embodiment of the present invention.

On the other hand, as illustrated in FIG. 4B, in a case where an obstacle O present within the distance range ΔD is a curb C, only first reflection positions are arranged along the obstacle O. That is, as described with reference to FIG. 3, since the level value of the reflection wave reflected by the curb C present within the distance range ΔD is a value greater than or equal to the first threshold value Lth1 and less than the second threshold value Lth2, reflection positions are calculated by the first reflection position calculating processing, but no reflection position is calculated in the second reflection position calculating processing.

By using the reflection positions calculated by the reflection position calculating unit 11, a type determining unit 12 determines the type of the obstacle O present within the distance range ΔD (hereinafter referred to as "determination target distance range") illustrated in FIGS. 3 and 4. Specifically, for example, when reflection positions within the determination target distance range ΔD, out of the reflection positions calculated by the reflection position calculating unit 11, include both a first reflection position and a second reflection position, the type determining unit 12 determines that the obstacle O corresponding to those reflection positions is a wall W. Alternatively, when the reflection positions within the determination target distance range ΔD include first reflection positions only, the type determining unit 12 determines that the obstacle O corresponding to those reflection positions is a curb C.

In FIG. 5, a table corresponding to the determination method is illustrated. That is, the type determining unit 12 determines the type of obstacle on the basis of the table illustrated in FIG. 5.

Note that in some cases a reflection position outside the determination target distance range ΔD is calculated by the reflection position calculating unit 11. In this case, the type determining unit 12 excludes any obstacle outside the determination target distance range ΔD as for the determination of types. This is firstly because, in obstacle detection for setting a guiding route for automatic parking, it is sufficient to set an obstacle within the determination target distance range ΔD as a target of determination of types. Secondly, this is because in a distance range smaller than the lower limit value of the determination target distance range ΔD (a distance range less than or equal to 1 meter in the example of FIGS. 3 and 4), the detection accuracy of the sonar devices 4L are 4R is generally low while, in a distance range greater than the upper limit value of the determination target distance range ΔD (a distance range greater than or equal to 3 meters in the example of FIGS. 3 and 4), a difference between the level value of the reflection wave reflected by the wall W and the level value of the reflection wave reflected by the curb C is small, and thus it is difficult to distinguish the two using the first threshold value Lth1 and the second threshold value Lth2.

A guiding route setting unit 21 sets a guiding route for automatic parking when the vehicle controlling unit 22 described later executes automatic parking in the form of parallel parking. At this time, the guiding route setting unit 21 sets different guiding routes depending on whether the determination result by the type determining unit 12 indicates the wall W or the curb C. Specifically, when the determination result indicates the curb C, the guiding route setting unit 21 sets a guiding route requiring a large amount of steering of the vehicle 1 in the case where the determination result indicates the curb C than in the case where the determination result indicates the wall W.

Figure 6A:
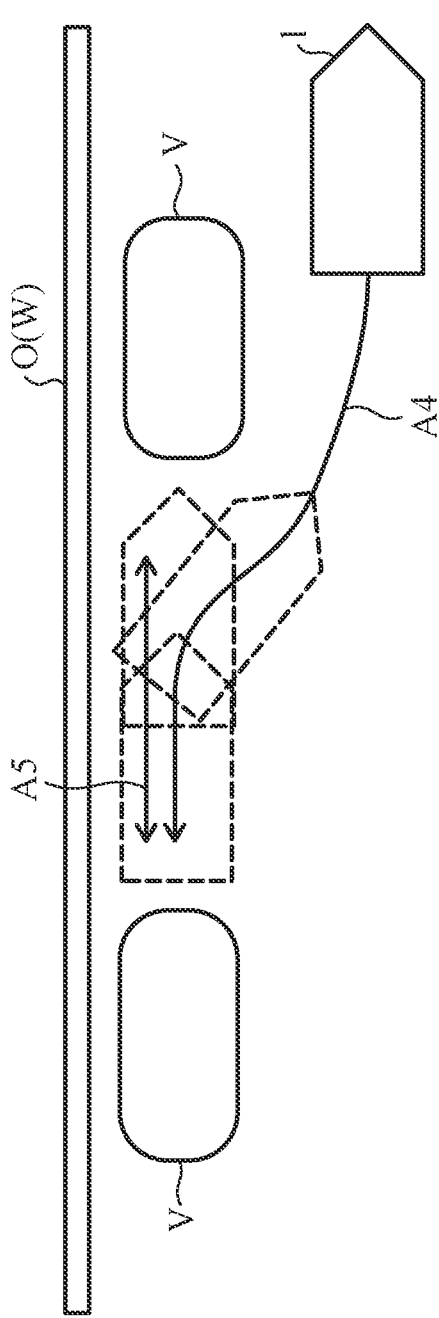
FIG. 6A is an explanatory diagram illustrating a guiding route for parallel parking set by a guiding route setting unit according to the first embodiment of the present invention.
Figure 6B:
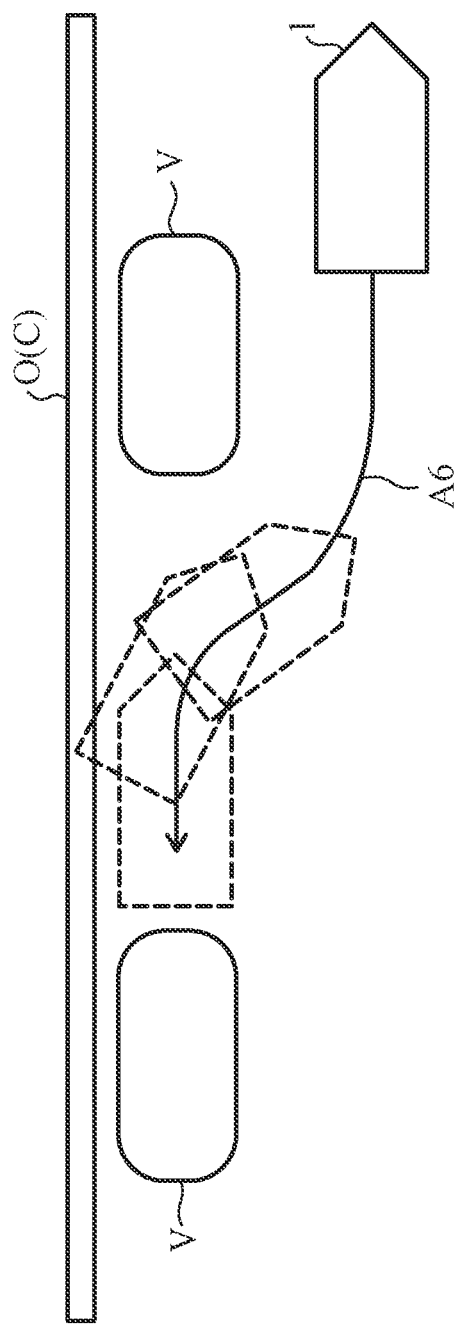
FIG. 6B is an explanatory diagram illustrating another guiding route for parallel parking set by the guiding route setting unit according to the first embodiment of the present invention.

In FIG. 6 examples of a guiding route set by the guiding route setting unit 21 are illustrated. Arrows A4 and A5 in FIG. 6A indicate a guiding route in the case where the obstacle O present in the back of another vehicle V is a wall W when the vehicle 1 performs parallel parking between two other vehicles V. On the other hand, the arrow A6 in FIG. 6B indicates a guiding route in the case where the obstacle O present in the back of the other vehicle V is a curb C in a case similar to the above.

As illustrated in FIG. 6, the guiding route (arrow A4) in the case where the obstacle O is the wall W requires a small amount of steering, compared with the guiding route (arrow A6) in the case where the obstacle O is the curb C. This prevents a corner of the vehicle 1 (in the example of FIG. 6A, the rear end of the left side of the vehicle 1) from coming into contact with the wall W. In this case, after the vehicle 1 enters a space between the two other vehicles V (arrow A4), the position and orientation of the vehicle 1 is adjusted by re-steering (arrow A5).

On the other hand, the guiding route (arrow A6) in the case where the obstacle O is the curb C requires a large amount of steering, compared with the guiding route (arrow A4) in the case where the obstacle O is the wall W. In the figure, although a corner of the vehicle 1 (the rear end of the left side of the vehicle 1 in the example of FIG. 6B) overlaps with the obstacle O during steering, the curb C enters a space below the rear bumper at this time, and thus the curb C and the vehicle 1 do not come into contact. Moreover, increasing the amount of steering reduces the number of times of re-steering after the steering (which is not required in the example of FIG. 6B), thereby shortening the time required for parking.

The vehicle controlling unit 22 executes automatic parking in the form of parallel parking by controlling a steering 5 of the vehicle 1 on the basis of the guiding route set by the guiding route setting unit 21. Note that the vehicle controlling unit 22 may control the brake 6 included in the vehicle 1 in addition to the steering 5. Moreover, the vehicle controlling unit 22 may control the torque of an engine 7 provided in the vehicle 1 as required in addition to the steering 5 and the brake 6.

An obstacle detection controlling unit 10 is configured by the reflection position calculating unit 11 and the type determining unit 12. An automatic parking controlling unit 20 is configured by the guiding route setting unit 21 and the vehicle controlling unit 22. The main part of a control device 30 is configured by the obstacle detection controlling unit 10 and the automatic parking controlling unit 20. The parking assistance device 100 is configured by the sonar devices 4L and 4R and the control device 30.

Figure 7A:
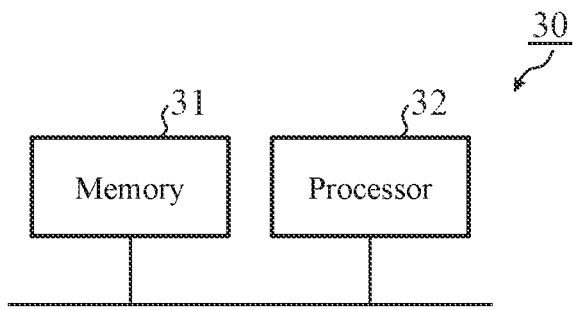
FIG. 7A is a hardware configuration diagram illustrating the main part of a control device according to the first embodiment of the present invention.

FIG. 7 illustrates an example of a hardware configuration of the main part of the control device 30. As illustrated in FIG. 7A, the control device 30 is configured by a general-purpose computer, and has a memory 31 and a processor 32. A program for causing the computer to function as the obstacle detection controlling unit 10 and the automatic parking controlling unit 20 illustrated in FIG. 1 is stored in the memory 31. By reading out and executing the program stored in the memory 31 by the processor 32, the functions of the obstacle detection controlling unit 10 and the automatic parking controlling unit 20 illustrated in FIG. 1 are implemented.

The memory 31 may be a semiconductor memory such as a random access memory (RAM), a read only memory (ROM), a flash memory, an erasable programmable read only memory (EPROM), or an electrically erasable programmable read only memory (EEPROM), or a magnetic disk device such as a hard disk drive (HDD). The processor 32 may be, for example, a central processing unit (CPU), a digital signal processor (DSP), a microcontroller, a microprocessor, or the like.

Figure 7B:
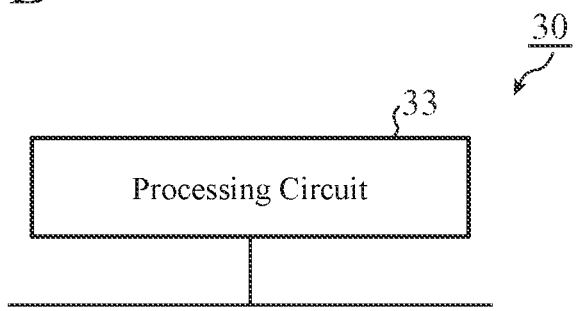
FIG. 7B is another hardware configuration diagram illustrating the main part of the control device according to the first embodiment of the present invention.

Alternatively, as illustrated in FIG. 7B, the control device 30 is configured by a dedicated processing circuit 33. The processing circuit 33 may be, for example, an application specific integrated circuit (ASIC), a field-programmable gate array (FPGA), a system large-scale integration (LSI), or a combination thereof.

Note that functions of the obstacle detection controlling unit 10 and the automatic parking controlling unit 20 illustrated in FIG. 1 may be separately implemented by the processing circuit 33. Alternatively, the functions of the units may be collectively implemented by the processing circuit 33. Specifically, for example, the function of the obstacle detection controlling unit 10 may be implemented by the processing circuit 33 included in a first electronic control unit (ECU) while the function of the automatic parking controlling unit 20 is implemented by another processing circuit 33 included in a second ECU. Alternatively, some of the functions of the obstacle detection controlling unit 10 and the automatic parking controlling unit 20 illustrated in FIG. 1 may be implemented by the memory 31 and the processor 32 illustrated in FIG. 7A while the rest of the functions may be implemented by the processing circuit 33 illustrated in FIG. 7B.

Figure 8:
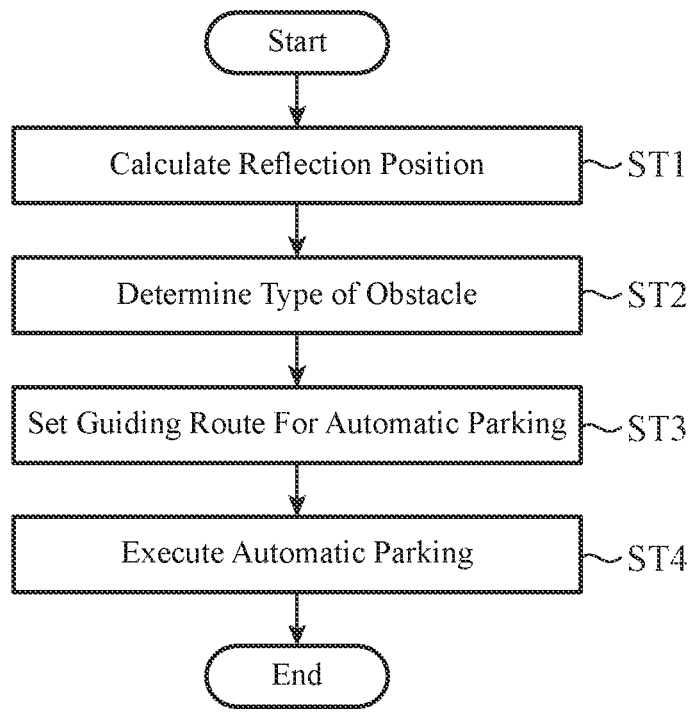
FIG. 8 is a flowchart illustrating the operation of the control device according to the first embodiment of the invention.

Next, with reference to a flowchart of FIG. 8, the operation of the control device 30 will be described. When a predetermined start condition is satisfied, for example when an operation instructing execution of automatic parking in the form of parallel parking is input to an operation input device (not illustrated), the control device 30 initiates processing of step ST1 when the vehicle 1 is travelling at a speed lower than or equal to the reference speed. The traveling speed of the vehicle 1 can be calculated using an output signal of the wheel speed sensor 2, or can be acquired from the ECU (not illustrated) or other units.

First in step ST1, the reflection position calculating unit 11 calculates reflection positions. Specifically, for example, the reflection position calculating unit 11 executes the first reflection position calculating processing and the second reflection position calculating processing alternately and repeatedly. The reflection position calculating unit 11 repeatedly executes calculating processing of a reflection position, for example, until the vehicle 1 stops.

Next, in step ST2, the type determining unit 12 determines the type of an obstacle O present within the determination target distance range $\Delta D$ by using the reflection positions calculated by the reflection position calculating unit 11 in step ST1. Specifically, for example, when reflection positions within the determination target distance range $\Delta D$, out of the reflection positions calculated by the reflection position calculating unit 11, include both a first reflection position and a second reflection position, the type determining unit 12 determines that the obstacle O corresponding to those reflection positions is a wall W. Alternatively, when the reflection positions within the determination target distance range $\Delta D$ include first reflection positions only, the type determining unit 12 determines that the obstacle O corresponding to those reflection positions is a curb C.

Next, in step ST3, the guiding route setting unit 21 sets a guiding route for parallel parking depending on the determination result of the type of the obstacle in step ST2. Specifically, when the determination result indicates the curb C, the guiding route setting unit 21 sets a guiding route requiring a large amount of steering of the vehicle 1 in the case where the determination result indicates the curb C than in the case where the determination result indicates the wall W.

Next, in step ST4, the vehicle controlling unit 22 executes automatic parking by controlling the steering 5 other components. At this time, the vehicle controlling unit 22 executes automatic parking in the form of parallel parking on the basis of the guiding route set by the guiding route setting unit 21 in step ST3. As a result, automatic parking is executed as illustrated in FIG. 6.

Note that the determination target distance range $\Delta D$ is not limited to a distance range of 1 to 3 meters but is only required to be a distance range that allows the level value of the reflection wave reflected by the curb C to be greater than or equal to the first threshold value Lth1 and less than the second threshold value Lth2 and the level value of the reflection wave reflected by the wall W to be greater than or equal to the second threshold value Lth2.

Moreover, the reflection position calculating unit 11 is not limited to the configuration in which the first reflection position calculating processing and the second reflection position calculating processing are repeated alternately but may have any configuration as long as the reflection position calculating unit 11 is capable of calculating a reflection position that allows the type determining unit 12 to determine whether the obstacle O within the determination target distance range $\Delta D$ is the wall W or the curb C. For example, the reflection position calculating unit 11 may calculate a reflection position as follows.

That is, when the vehicle 1 is traveling at a speed lower than or equal to the reference speed, the reflection position calculating unit 11 causes the sonar device 4L or 4R to transmit an ultrasonic wave multiple times. When receiving a reflection wave a level value of which is greater than or equal to the first threshold value Lth1 and lower than the second threshold value Lth2, the reflection position calculating unit 11 calculates a reflection position corresponding to the reflection wave (hereinafter referred to as a "low reflection position") for the ultrasonic wave at each time. Moreover, when receiving a reflection wave a level value of which is greater than the second threshold value Lth2, the reflection position calculating unit 11 calculates a reflection position corresponding to the reflection wave (hereinafter referred to as a "high reflection position") for the ultrasonic wave at each time.

In this case, in the case where reflection positions within the determination target distance range ΔD out of reflection positions calculated by the reflection position calculating unit 11 are high reflection positions, the type determining unit 12 determines that the obstacle O corresponding to those reflection positions is the wall W. Alternatively, in the case where reflection positions within the determination target distance range ΔD out of the reflection positions calculated by the reflection position calculating unit 11 are low reflection positions, the type determining unit 12 determines that the obstacle O corresponding to those reflection positions is the curb C.

As described above, the parking assistance device 100 according to the first embodiment includes: the pair of left and right sonar devices 4L and 4R provided to the vehicle 1; the obstacle detection controlling unit 10 for determining whether an obstacle O present within a determination target distance range ΔD on a side of the vehicle 1 is a wall W or a curb C by comparing a level value of a reflection wave received by one of the sonar devices 4L and 4R with each of the first threshold value Lth1 and the second threshold value Lth2 that are different from each other; and the automatic parking controlling unit 20 for setting a guiding route for automatic parking depending on a determination result by the obstacle detection controlling unit 10, and the automatic parking controlling unit 20 sets the guiding route requiring a large amount of steering of the vehicle 1 in a case where the determination result indicates a curb C, with respect to a case where the determination result indicates a wall W in the automatic parking in the form of parallel parking. As a result, in the case where the obstacle O is the wall W, it is possible to set a guiding route for avoiding the vehicle 1 from coming into contact with the wall W, and in the case where the obstacle O is the curb C, it is possible to set a guiding route that requires less number of times of re-steering. In other words, it is possible to set an appropriate guiding route depending on whether the obstacle O is the curb C or the wall W. Moreover, by including the pair of left and right sonar devices 4L and 4R at the front half of the vehicle 1, the travel distance required for detecting the obstacle O can be shortened as compared to the device of Patent Literature 1 that uses the Fr sonar devices and the Rr sonar devices. Furthermore, by reducing the time interval between the timing of executing the first reflection position calculating processing and the timing of executing the second reflection position calculating processing, it is possible to enhance the detection accuracy of the obstacle O as compared to the device of Patent Literature 1 that uses the Fr sonar devices and the Rr sonar devices.

Second Embodiment

Figure 9:
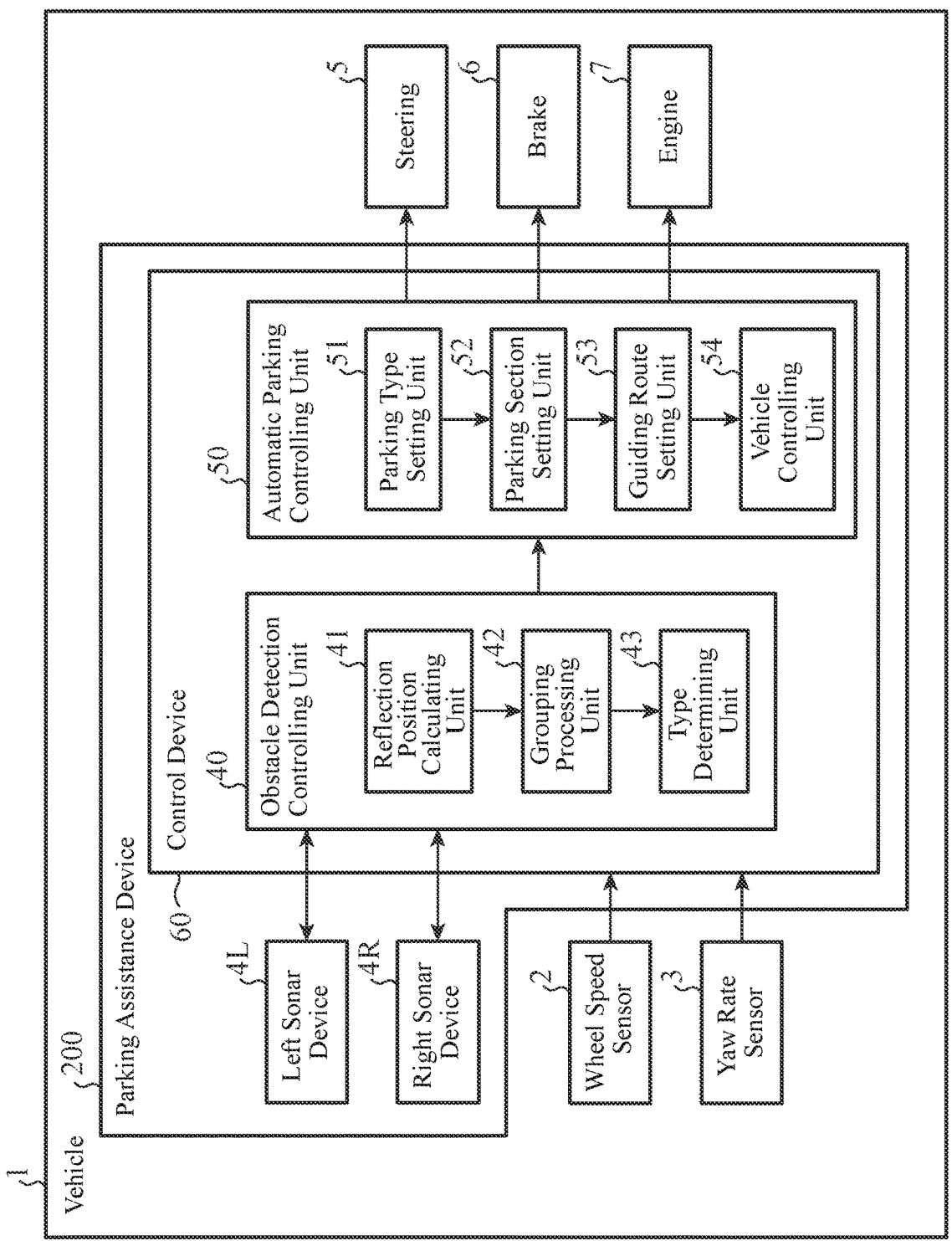
FIG. 9 is a functional block diagram illustrating a parking assistance device according to a second embodiment of the present invention mounted on a vehicle.

FIG. 9 is a functional block diagram illustrating a parking assistance device according to a second embodiment of the present invention mounted on a vehicle. With reference to FIG. 9, a parking assistance device 200 according to the second embodiment will be described. Note that in FIG. 9 the same symbol is given to a block similar to that in the functional block diagram of the first embodiment illustrated in FIG. 1, and descriptions thereof will be omitted.

A reflection position calculating unit 41 calculates a first reflection position by executing first reflection position calculating processing similar to that of the reflection position calculating unit 11 illustrated in FIG. 1. The reflection position calculating unit 41 further calculates a second reflection position by executing the second reflection position calculating processing similar to that of the reflection position calculating unit 11 illustrated in FIG. 1. For example when a vehicle controlling unit 54, which will be described later, executes automatic parking in the form of parallel parking or double parking, the reflection position calculating unit 41 executes the first reflection position calculating processing and the second reflection position calculating processing alternately and repeatedly when a vehicle 1 is travelling at a speed lower than or equal to a reference speed.

FIG. 10 is a diagram illustrating an example of reflection positions calculated by the reflection position calculating unit 41. As illustrated in FIG. 10A, in a case where an obstacle O1 present in a determination target distance range ΔD is a wall W, first reflection positions and second reflection positions are alternately arranged along the obstacle O1. On the other hand, as illustrated in FIG. 10B, in a case where an obstacle O1 present within the determination target distance range ΔD is a curb C, only first reflection positions are arranged along the obstacle O1. That is, reflection positions corresponding to the obstacle O1 are similar to those described with reference to FIG. 4 in the first embodiment.

Here, obstacles O2 and O3 present on a near side with respect to the obstacle O1 are other vehicles V. Generally, when an ultrasonic wave emitted by the sonar device 4L or 4R is reflected by another vehicle V, a route of the ultrasonic wave runs along an orientation of the sonar device 4L or 4R, that is, a route similar to the arrow A1 illustrated in FIG. 2A. Therefore, when the other vehicle V is present within the determination target distance range ΔD, a level value of the reflection wave reflected by the other vehicle V is greater than or equal to the second threshold value Lth2 illustrated in FIG. 3. Therefore, reflection positions are calculated by both the first reflection position calculating processing and the second reflection position calculating processing. As a result, as illustrated in FIG. 10, first reflection positions and second reflection positions are alternately arranged along the obstacles O2 and O3.

A grouping processing unit 42 groups the reflection positions calculated by the reflection position calculating unit 41. Specifically, for example, in a case where the distance between a plurality of reflection positions adjacent to each other has a value less than or equal to a predetermined value (for example, 30 cm), the grouping processing unit 42 sets these reflection positions in the same group.

Figure 11A:
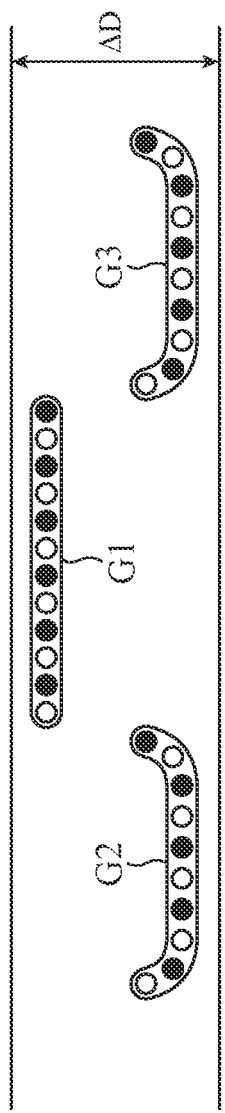
FIG. 11A is an explanatory diagram illustrating groups set by a grouping processing unit according to the second embodiment of the present invention.
Figure 11B:
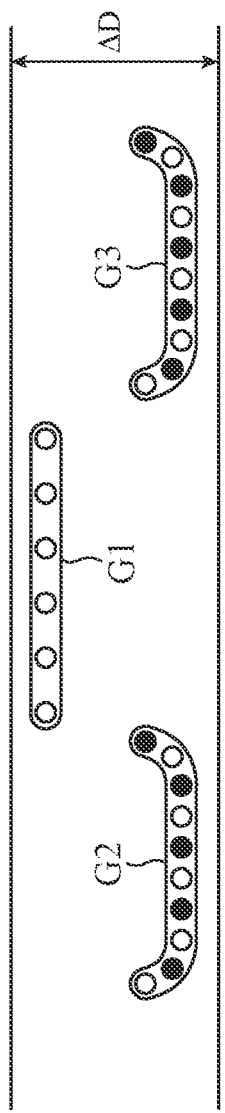
FIG. 11B is an explanatory diagram illustrating other groups set by the grouping processing unit according to the second embodiment of the present invention.

FIG. 11 illustrates an example of groups set by the grouping processing unit 42. In the case where the reflection positions illustrated in FIG. 10A are grouped by the grouping processing unit 42, as illustrated in FIG. 11A, a group G1 corresponding to the obstacle O1, a group G2 corresponding to the obstacle O2, and a group G3 corresponding to the obstacle O3 are set. Moreover, in the case where the reflection positions illustrated in FIG. 10B are grouped by the grouping processing unit 42, as illustrated in FIG. 11B, a group G1 corresponding to the obstacle O1, a group G2 corresponding to the obstacle O2, and a group G3 corresponding to the obstacle O3 are set.

Using the grouping result by the grouping processing unit 42, a type determining unit 43 determines the type of each of one or more obstacles (three obstacles O1 to O3 in the example of FIG. 10) present within the determination target distance range ΔD. Specifically, for example, the type determining unit 43 determines whether an obstacle corresponding to a group is the curb C, the wall W, or another vehicle V depending on whether the group includes a second reflection position. Moreover, the type determining unit 43 determines whether an obstacle corresponding to each of the groups is the curb C, the wall W, another vehicle V parallel parked, or another vehicle V perpendicularly parked depending on the shape of the group. The type determining unit 43 determines whether an obstacle corresponding to each of the groups is the curb C, the wall W, another vehicle V parallel parked, or another vehicle V perpendicularly parked from a combination of the determination result based on whether there is a second reflection position and the determination result based on the shape of the group.

Hereinafter, a specific example of the determination method based on the shape of a group will be described. First, for each of one or more groups set by the grouping processing unit 42, the type determining unit 43 calculates straight lines (hereinafter referred to as "inter-reflection position lines") each connecting two mutually adjacent reflection positions, and calculates a normal vector for each of the inter-reflection position lines.

FIG. 12 illustrates an example of inter-reflection position lines SL and normal vectors NV. FIG. 12A is a diagram illustrating inter-reflection position lines SL and normal vectors NV in a group corresponding to the wall W. FIG. 12B is a diagram illustrating inter-reflection position lines SL and normal vectors NV in a group corresponding to the curb C. FIG. 12C is a diagram illustrating inter-reflection position lines SL and normal vectors NV in a group corresponding to another vehicle V parallel parked. FIG. 12D is a diagram illustrating inter-reflection position lines SL and normal vectors NV in a group corresponding to another vehicle V perpendicularly parked.

Figure 13:
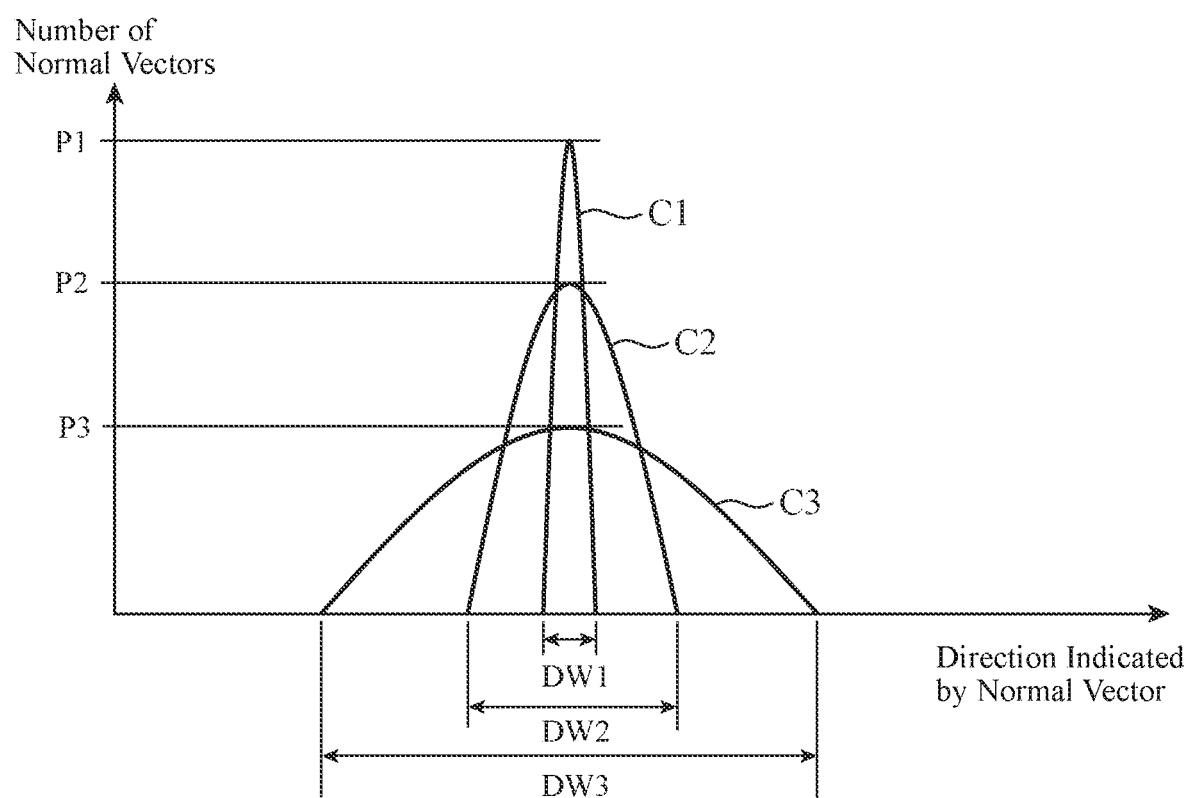
FIG. 13 is a characteristic graph illustrating curves corresponding to histograms that indicate variations in the direction indicated by normal vectors in the respective groups.

FIG. 13 is a graph illustrating curves corresponding to histograms in which the horizontal axis represents the direction indicated by normal vectors NV and the vertical axis represents the number of normal vectors NV indicating each direction. A curve C1 corresponds to the histogram of the group corresponding to the wall W or the curb C. A curve C2 corresponds to the histogram of the group corresponding to the other vehicle V parallel parked. A curve C3 corresponds to the histogram of the group corresponding to the other vehicle V perpendicularly parked.

Figure 12A:
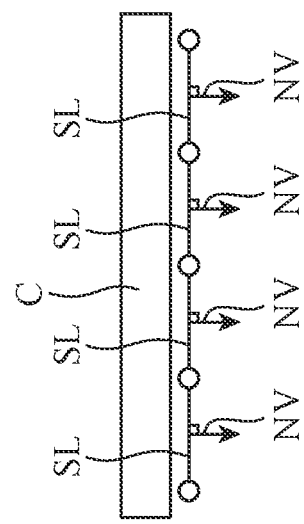
FIG. 12A is an explanatory diagram illustrating inter-reflection position lines and normal vectors in a group corresponding to a wall.
Figure 12B:
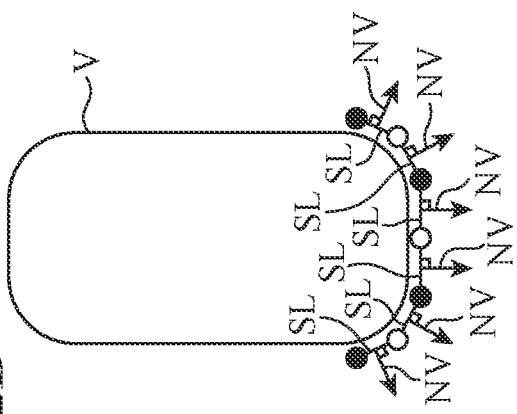
FIG. 12B is an explanatory diagram illustrating inter-reflection position lines and normal vectors in a group corresponding to a curb.

Generally, the wall W or the curb C has a lot of linear parts. For this reason, as illustrated in FIGS. 12A and 12B, a plurality of reflection positions are linearly arranged, and substantially all the normal vectors NV indicate the same direction. As a result as illustrated in FIG. 13, in the group corresponding to the wall W or the curb C, a value for indicating variations in the direction indicated by the normal vectors NV (Hereinafter referred to as a "variation value." For example, a distribution width DW1 of the curve C1, a ratio of the distribution width DW1 to a peak value P1 of the curve C1, a variance of the curve C1, or a standard deviation of the curve C1) is small.

Figure 12C:
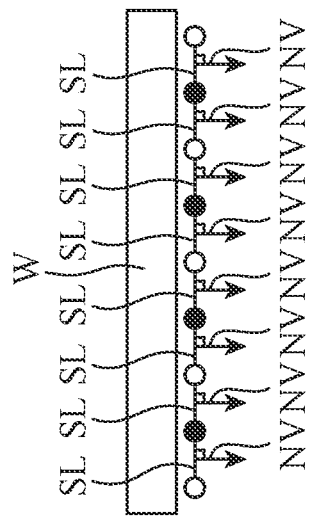
FIG. 12C is an explanatory diagram illustrating inter-reflection position lines and normal vectors in a group corresponding to another vehicle that is parallel parked.
Figure 12D:
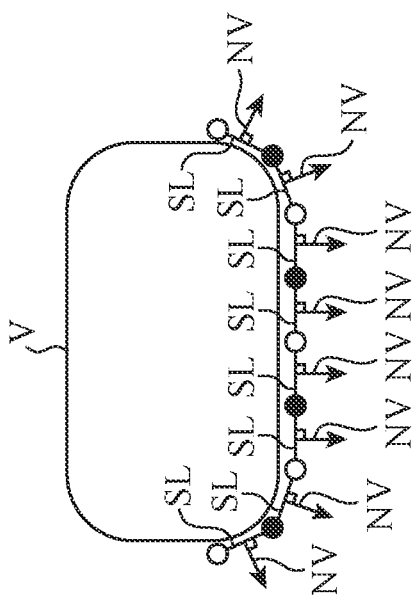
FIG. 12D is an explanatory diagram illustrating inter-reflection position lines and normal vectors in a group corresponding to another vehicle that is perpendicularly parked.

Moreover, in general, a side surface of the other vehicle V has a lot of linear parts. Therefore, as illustrated in FIG. 12C, a plurality of reflection positions are linearly arranged along the side surface of the other vehicle V. However, in the front end and the rear end (hereinafter collectively referred to as "nose parts") of the other vehicle V, a plurality of reflection positions are arranged in a curved shape or into a straight line shape along a direction different from that of the straight line extending along the side surface of the other vehicle V due to the shape of the nose parts, the calculation accuracy of reflection positions by the reflection position calculating unit 41, and the property of ultrasonic waves. As a result as illustrated in FIG. 13, in the group corresponding to the other vehicle V parallel parked, a variation value of the direction indicated by the normal vectors NV (For example, a distribution width DW2 of the curve C2, a ratio of the distribution width DW2 to a peak value P2 of the curve C2, a variance of the curve C2, or a standard deviation of the curve C2) is larger than that of the group corresponding to the wall W or the curb C.

In general, the size of the other vehicle V in the lateral direction (hereinafter referred to as a "vehicle width") is smaller than the size of the other vehicle V in the longitudinal direction (hereinafter referred to as an "entire length"). Therefore, the arrangement of reflection positions corresponding to the other vehicle V perpendicularly parked (FIG. 12D) has fewer linear parts than the arrangement of reflection positions corresponding to the other vehicle V parallel parked (FIG. 12C). As a result as illustrated in FIG. 13, in the group corresponding to the other vehicle V perpendicularly parked, a variation value of the direction indicated by the normal vectors NV (For example, a distribution width DW3 of the curve C3, a ratio of the distribution width DW3 to a peak value P3 of the curve C3, a variance of the curve C3, or a standard deviation of the curve C3) is larger than that of the group corresponding to the other vehicle V parallel parked.

In the type determining unit 43, a threshold value which is larger than the variation value of the curve Cl and smaller than the variation value of the curve C2 (Hereinafter referred to as the "first distribution threshold value") and a threshold value which is and larger than the variation value of the curve C2 and smaller than the variation value of the curve C3 (hereinafter referred to as the "second distribution threshold value") are set in advance. The type determining unit 43 calculates a variation value of each group and compares the calculated variation values with each of the first distribution threshold value and the second distribution threshold value. In the case where the calculated variation value is smaller than the first distribution threshold value, the type determining unit 43 determines that an obstacle corresponding to the group is the wall W or the curb C. In the case where the calculated variation value is larger than or equal to the first distribution threshold value and smaller than the second distribution threshold value, the type determining unit 43 determines that an obstacle corresponding to the group is the other vehicle V parallel parked. In the case where the calculated variation value is larger than or equal to the second distribution threshold value, the type determining unit 43 determines that an obstacle corresponding to the group is the other vehicle V perpendicularly parked.

Note that curves corresponding to histograms, in which the horizontal axis represents the direction along inter-reflection position lines SL and the vertical axis represents the number of inter-reflection position lines SL along each direction, are similar to the curves C1 to C3 illustrated in FIG. 13. The type determining unit 43 may determine the type of an obstacle corresponding to each group by comparing a variation value in the direction along inter-reflection position lines SL with the first distribution threshold value and the second distribution threshold value instead of the variation value in the direction indicated by normal vectors NV.

Furthermore, curves corresponding to histograms, in which the horizontal axis represents the angle formed by a predetermined reference angle (for example a travelling direction of the vehicle 1) and an inter-reflection position line SL and the vertical axis represents the number of inter-reflection position lines SL that forms that angle, are similar to the curves C1 to C3 illustrated in FIG. 13. The type determining unit 43 may determine the type of an obstacle corresponding to each group by comparing a variation value in the angle formed by the reference angle and inter-reflection position lines SL with the first distribution threshold value and the second distribution threshold value instead of the variation value in the direction indicated by normal vectors NV.

In FIG. 14, tables corresponding to the determination method based on whether there is a second reflection position and on the shape of the group are illustrated. In FIG. 14A a table in the case where a variation value in the direction indicated by normal vectors NV is used is illustrated. In FIG. 14B a table in the case where a variation value in the direction along the inter-reflection position lines SL is used is illustrated. In FIG. 14C a table in the case where a variation value in the angle formed by the reference direction and inter-reflection position lines SL is used is illustrated. In the figures, "small" indicates that a variation value is less than the first distribution threshold value. "Medium" indicates that a variation value is greater than or equal to the first distribution threshold value and less than the second distribution threshold value. "Large" indicates that a variation value is greater than or equal to the second distribution threshold value.

A parking type setting unit 51 sets a type of automatic parking (hereinafter referred to as a "parking type") to be executed by the vehicle controlling unit 54, which will be described later, using the result of the grouping by the grouping processing unit 42 and the determination result by the type determining unit 43. Specifically, for example, the parking type setting unit 51 determines a parking type as parallel parking when there is another vehicle V parallel parked within the determination target distance range ΔD. Alternatively, the parking type setting unit 51 sets a parking type as double parking when there is another vehicle V perpendicularly parked within the determination target distance range ΔD.

A parking section setting unit 52 extracts a section where the vehicle 1 can be parked (hereinafter referred to as a "parkable section") depending on the result of grouping by the grouping processing unit 42, the result of determination by the type determining unit 43, and the parking type set by the parking type setting unit 51. The parking section setting unit 52 sets the extracted parkable section as a target section of automatic parking (hereinafter referred to as a "parking target section") executed by the vehicle controlling unit 54 to be described later.

Specifically, for example, information indicating the entire length and the vehicle width of the vehicle 1 is stored in advance in the parking section setting unit 52. In the case where the parking type is set to parallel parking, the parking section setting unit 52 extracts, as a parkable section, a section where no obstacle such as the other vehicle V is present over a distance range larger than the entire length of the vehicle 1. Similarly, in the case where the parking type is set to double parking, the parking section setting unit 52 extracts, as a parkable section, a section where no obstacle such as the other vehicle V is present over a distance range larger than the vehicle width of the vehicle 1. The parking section setting unit 52 sets the extracted parkable section as a parking target section.

A guiding route setting unit 53 sets a guiding route for automatic parking depending on the result of the grouping by the grouping processing unit 42, the determination result by the type determining unit 43, the parking type set by the parking type setting unit 51, and the parking target section set by the parking section setting unit 52.

That is, in the case where the parking type is set to parallel parking, the guiding route setting unit 53 sets a guiding route for parallel parking. The guiding route for parallel parking is similar to that explained in the first embodiment with reference to FIG. 6, and thus illustration and description thereof will be omitted. Moreover, in the case where the parking type is set to double parking, the guiding route setting unit 53 sets a guiding route for double parking. Since the guiding route for double parking is a normal guiding route as indicated by an arrow A7 in FIG. 15, description thereof will be omitted.

The vehicle controlling unit 54 executes automatic parking in the form of parallel parking or double parking by controlling a steering 5 of the vehicle 1 on the basis of the guiding route set by the guiding route setting unit 53. Note that the vehicle controlling unit 54 may control a brake 6 included in the vehicle 1 in addition to the steering 5. Moreover, the vehicle controlling unit 54 may control the torque of an engine 7 included in the vehicle 1 as required in addition to the steering 5 and the brake 6.

An obstacle detection controlling unit 40 is configured by the reflection position calculating unit 41, the grouping processing unit 42, and the type determining unit 43. An automatic parking controlling unit 50 is configured by the parking type setting unit 51, the parking section setting unit 52, the guiding route setting unit 53, and the vehicle controlling unit 54. The main part of a control device 60 is configured by the obstacle detection controlling unit 40 and the automatic parking controlling unit 50. The parking assistance device 200 is configured by the sonar devices 4L and 4R and the control device 60.

Since a hardware configuration of the main part of the control device 60 is similar to that described with reference to FIG. 7 in the first embodiment, illustration and description thereof are omitted.

Figure 16:
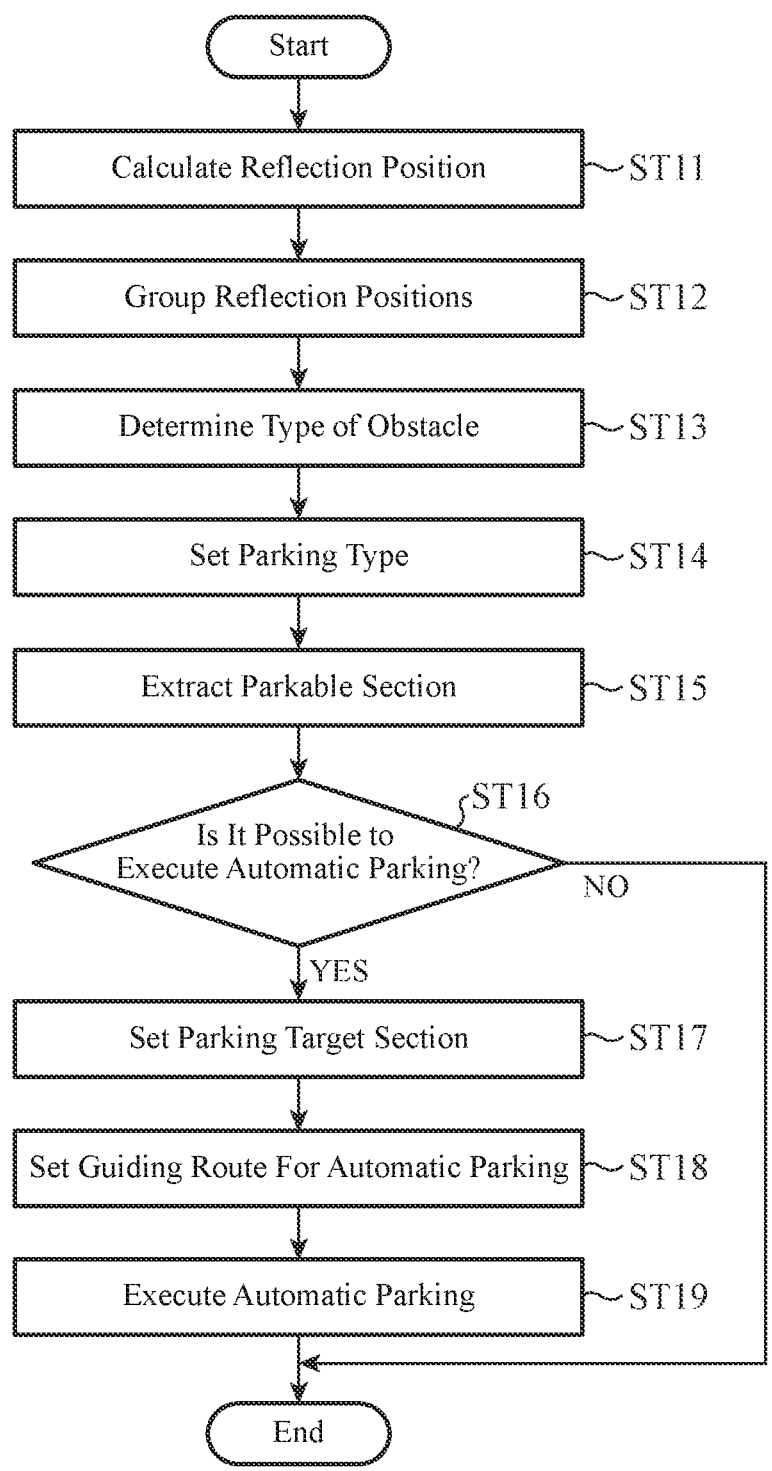
FIG. 16 is a flowchart illustrating the operation of a control device according to the second embodiment of the invention.

Next, with reference to a flowchart of FIG. 16, the operation of the control device 60 will be described. When a predetermined start condition is satisfied, for example when an operation instructing execution of automatic parking is input to an operation input device (not illustrated), the control device 60 initiates processing of step ST11 when the vehicle 1 is travelling at a speed lower than or equal to the reference speed.

First in step ST11, the reflection position calculating unit 41 calculates reflection positions. Specifically, for example, the reflection position calculating unit 41 executes the first reflection position calculating processing and the second reflection position calculating processing alternately and repeatedly. The reflection position calculating unit 41 repeatedly executes calculating processing of a reflection position, for example, until the vehicle 1 stops.

Next, in step ST12, the grouping processing unit 42 groups reflection positions within the determination target distance range ΔD out of the reflection positions calculated by the reflection position calculating unit 41 in step ST11. Specifically, for example, in a case where the distance between a plurality of reflection positions adjacent to each other has a value less than or equal to a predetermined value (for example, 30 cm), the grouping processing unit 42 sets these reflection positions in the same group.

Next, in step ST13, the type determining unit 43 determines the type of obstacle corresponding to each of the one or more groups set by the grouping processing unit 42 in step ST12. Specifically, for example, the type determining unit 43 determines which of the curb C, the wall W, another vehicle V parallel parked, and another vehicle V perpendicularly parked is an obstacle corresponding to each of the groups in accordance with one of the tables illustrated in FIGS. 14A to 14C.

Next, in step ST14, the parking type setting unit 51 sets a parking type by using the grouping result in step ST12 and the determination result of the type of obstacle in step ST13. Specifically, for example, the parking type setting unit 51 sets a parking type as parallel parking when there is another vehicle V parallel parked within the determination target distance range ΔD. Alternatively, the parking type setting unit 51 sets a parking type as double parking when there is another vehicle V perpendicularly parked within the determination target distance range ΔD.

Next, in step ST15, the parking section setting unit 52 executes processing for extracting a parkable section depending on the result of grouping in step ST12, the determination result of the type of obstacle in step ST13, and the parking type set in step ST14. Specifically, for example in the case where the parking type is set to parallel parking, the parking section setting unit 52 extracts, as a parkable section, a section where no obstacle such as the other vehicle V is present over a distance range larger than the entire length of the vehicle 1. On the other hand, in the case where the parking type is set to double parking, the parking section setting unit 52 extracts, as a parkable section, a section where no obstacle such as the other vehicle V is present over a distance range larger than the vehicle width of the vehicle 1.

Next, in step ST16, the parking section setting unit 52 determines whether the vehicle controlling unit 54 can execute automatic parking. That is, in the case where the parkable section is extracted by the processing of step ST15, the parking section setting unit 52 determines that automatic parking can be executed (step ST16 "YES"). On the other hand, in the case where no parkable section is extracted by the processing of step ST15, the parking section setting unit 52 determines that execution of automatic parking is impossible (step ST16 "NO").

If automatic parking can be executed (step ST16 "YES"), in step ST17, the parking section setting unit 52 sets a parking target section. That is, the parking section setting unit 52 sets the parkable section extracted by the processing of step ST15 as the parking target section.

Figure 15:
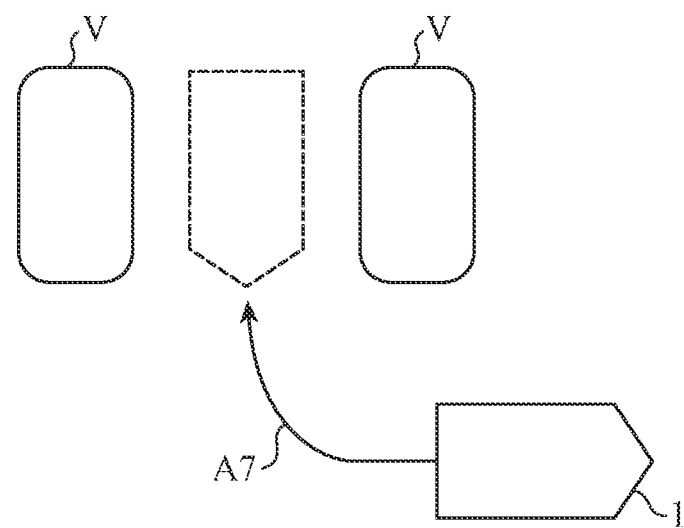
FIG. 15 is an explanatory diagram illustrating a guiding route for double parking set by a guiding route setting unit according to the second embodiment of the present invention.

Next, in step ST18, the guiding route setting unit 53 sets a guiding route for automatic parking depending on the result of grouping in step ST12, the determination result of the type of obstacle in step ST13, the parking type set in step ST14, and the parking target section set in step ST17. That is, in the case where the parking type is set to parallel parking, the guiding route setting unit 53 sets a guiding route for parallel parking as illustrated in FIG. 6. On the other hand, in the case where the parking type is set to double parking, the guiding route setting unit 53 sets a guiding route for double parking as illustrated in FIG. 15.

Next, in step ST19, the vehicle controlling unit 54 executes automatic parking by controlling the steering 5 or other components. At this time, the vehicle controlling unit 54 executes automatic parking in the form of parallel parking or double parking on the basis of the guiding route set in step ST18.

If automatic parking cannot be executed (step ST16 "NO"), the processing of steps ST17 to ST19 is skipped. At this time, the control device 60 may display an image, which indicates that there is no parkable section or that automatic parking cannot be executed, on a display device (not illustrated) such as a liquid crystal display provided in the vehicle 1. Alternatively, the control device 60 may cause an audio output device (not illustrated) such as a speaker provided in the vehicle 1 to output audio that indicates that no parkable section is present or that automatic parking cannot be executed.

Note that the parking section setting unit 52 may extract a plurality of parkable sections in step ST15 and select any one of the plurality of parkable sections in step ST17 as the parking target section (for example, a parkable section closest to the current position of the vehicle 1, or a parkable section where no obstacle such as the other vehicle V is present over the longest distance). At this time, the condition for selecting a parkable section to be a parking target section may be preset in the control device 60 or may be set by a user. As a result, in the case where there are a plurality of parkable sections, a parkable section that is more suitable for automatic parking can be set as the parking target section.

Moreover, the type of obstacles to be judged by the type determining unit 43 is not limited to the four types of a curb C, a wall W, another vehicle V parallel parked, and another vehicle V perpendicularly parked. For example, in a case where there is a group including only first reflection positions on a near side with respect to the groups G2 and G3 corresponding to the other vehicles V, the type determining unit 43 may determine that an obstacle corresponding to the group is a step that can be crossed over.

Figure 17:
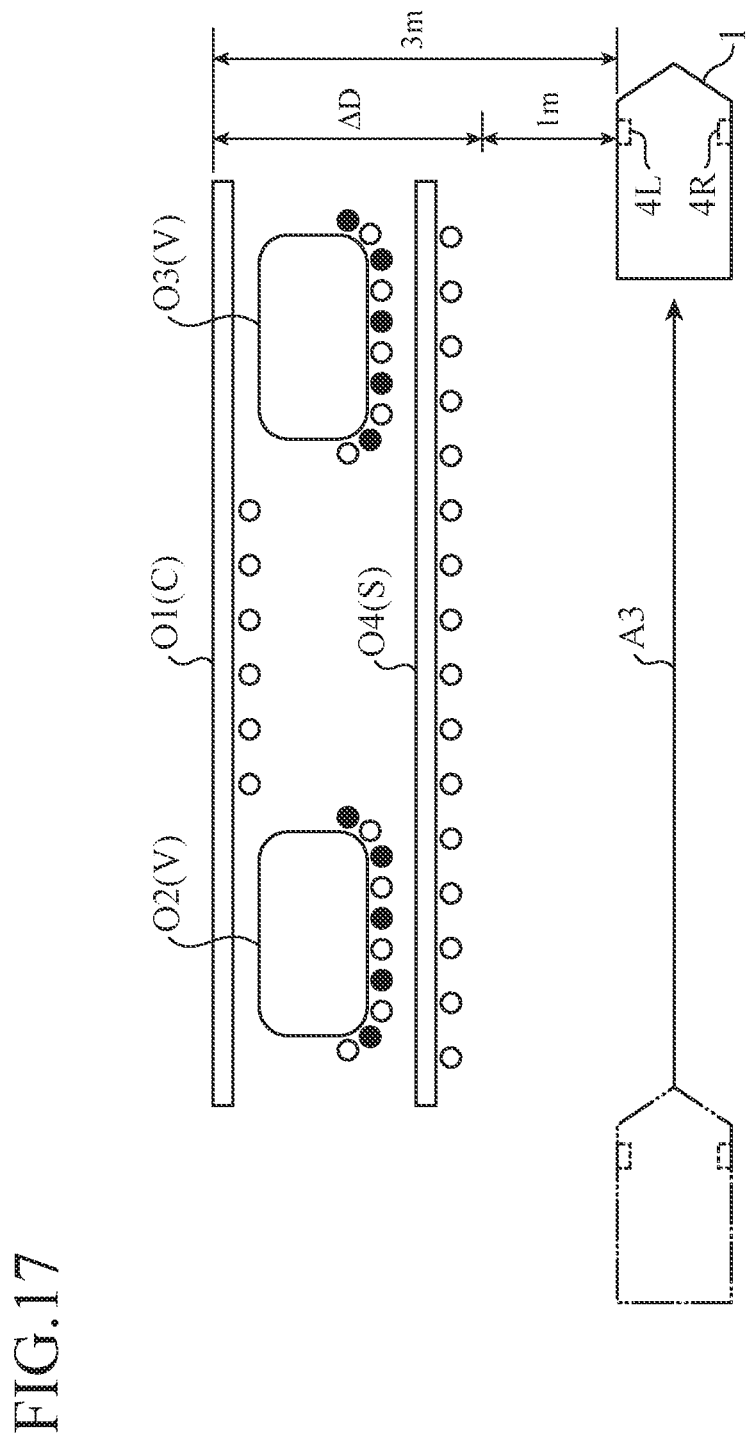
FIG. 17 is an explanatory diagram illustrating still other reflection positions calculated by the reflection position calculating unit according to the second embodiment of the present invention.

In FIG. 17 is a diagram illustrating another example of reflection positions calculated by the reflection position calculating unit 41. In FIG. 17, an obstacle O4 present on a near side with respect to obstacles O2 and O3 is a step S that can be crossed over. Generally, in the case where an ultrasonic wave emitted by the sonar device 4L or 4R is reflected by the step S, a route of the ultrasonic wave is shifted downward than the orientation of the sonar device 4L or 4R, that is, a route similar to the arrow A2 illustrated in FIG. 2B. Therefore, in a case where the step S is present within the determination target distance range ΔD, a level value of a reflection wave reflected by the step S is greater than or equal to the first threshold value Lth1 and less than the second threshold value Lth2. Therefore, while reflection positions are calculated in the first reflection position calculating processing, no reflection position is calculated in the second reflection position calculating processing. As a result, as illustrated in FIG. 17, only first reflection positions are arranged along the obstacle O4.

Figure 18:
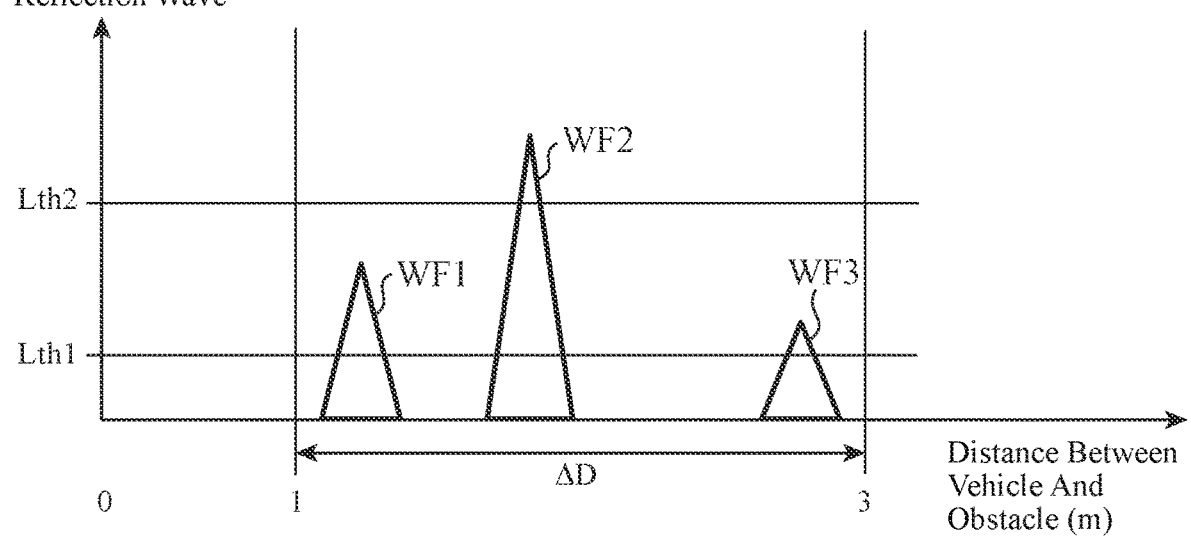
FIG. 18 is a characteristic graph illustrating a waveform of a reflection wave reflected by a step, a waveform of a reflection wave reflected by another vehicle, and a waveform of a reflection wave reflected by a curb.

In FIG. 18, an example of waveforms of reflection waves reflected by the obstacles O1 to O4 illustrated in FIG. 17 is illustrated. In the figure, WF1 represents a waveform of reflection waves reflected by the obstacle O4, that is, the step S. WF2 indicates a waveform of reflection waves reflected by the obstacle O2 or the obstacle O3, that is, another vehicle V. WF3 indicates a waveform of reflection waves reflected by the obstacle O1, that is, the curb C. As illustrated in FIG. 18, a level value of a reflection wave reflected by the step S is greater than or equal to the first threshold value Lth1 and lower than the second threshold value Lth2. A level value of a reflection wave reflected by the other vehicle V is greater than or equal to the second threshold value Lth2. A level value of a reflection wave reflected by the curb C is larger than or equal to the first threshold value Lth1 and less than the second threshold value Lth2.

Note that, in the case where an ultrasonic wave emitted by the sonar device 4L or 4R is reflected by both obstacles of the obstacle O4 (step S) and the obstacles O2 and O3 (other vehicles V), a timing at which the sonar device 4L or 4R receives a reflection wave reflected by the obstacle O4 and a timing at which the sonar device 4L or 4R receives reflection waves reflected by the obstacles O2 and O3 are different from each other. Therefore, the reflection position calculating unit 11 can calculate reflection positions while discriminating between the reflection wave reflected by the obstacle O4 and the reflection waves reflected by the obstacles O2 and O3. Similarly, the reflection position calculating unit 11 can calculate reflection positions while discriminating between the reflection wave reflected by the obstacle O4 (step S) and the reflection wave reflected by the obstacle O1 (curb C).

Figure 19:
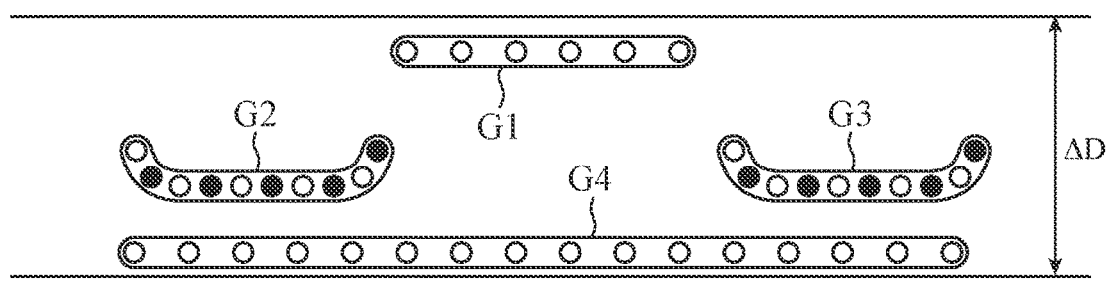
FIG. 19 is an explanatory diagram illustrating yet other groups set by the grouping processing unit according to the second embodiment of the present invention.

FIG. 19 illustrates another example of groups set by the grouping processing unit 42. In the figure, a group G4 corresponds to an obstacle O4. The type determining unit 43 determines the type of the obstacles O1 to O4 corresponding to groups G1 to G4, respectively, on the basis of one of the tables illustrated in FIGS. 14A to 14C. As a result, it is determined that the obstacle O1 and the obstacle O4 are curbs C and that the obstacle O2 and the obstacle O3 are other vehicles V. Next, the type determining unit 43 corrects the determination result from a curb C to a step S as to the obstacle O4 corresponding to the group G4 that is located on the near side with respect to the groups G2 and G3 that have been determined as being corresponding to the other vehicles V and includes only first reflection positions.

Furthermore, in the case where it is determined that the step S is present on the near side with respect to the other vehicle V, the vehicle controlling unit 54 may control the torque of an engine 7 so as to allow the vehicle 1 to cross over the step S when automatic parking is executed.

In addition, the parking assistance device 200 can adopt various modifications similar to those described in the first embodiment. For example, the reflection position calculating unit 41 may calculate low reflection positions and high reflection positions instead of first reflection positions and second reflection positions. Instead of determining whether a second reflection position is included in each group, the type determining unit 43 may determine the type of the obstacle corresponding to the group depending on whether reflection positions included in each group are low reflection positions or high reflection positions.

As described above, in the parking assistance device 200 according to the second embodiment, the obstacle detection controlling unit 40 sets groups G1 to G3 corresponding to the obstacles O1 to O3, respectively, by grouping reflection positions of reflection waves indicated by comparison results between level values and each of the first threshold value and the second threshold value and determines whether the obstacles O1 to O3 are the wall W, the curb C, or the other vehicles V depending on the shape of the groups G1 to G3. As a result, it is possible to set an appropriate guiding route depending on the type of the obstacles O1 to O3.

Furthermore, the automatic parking controlling unit 50 sets a guiding route for parallel parking or a guiding route for double parking depending on the result of grouping by the obstacle detection controlling unit 40. As a result, it is possible to prevent the vehicle controlling unit 54 from executing automatic parking in the form of double parking in a parallel parking section or executing automatic parking in the form of parallel parking in a double parking section. That is, occurrence of erroneous parking by the vehicle controlling unit 54 can be prevented.

Third Embodiment

Figure 20:
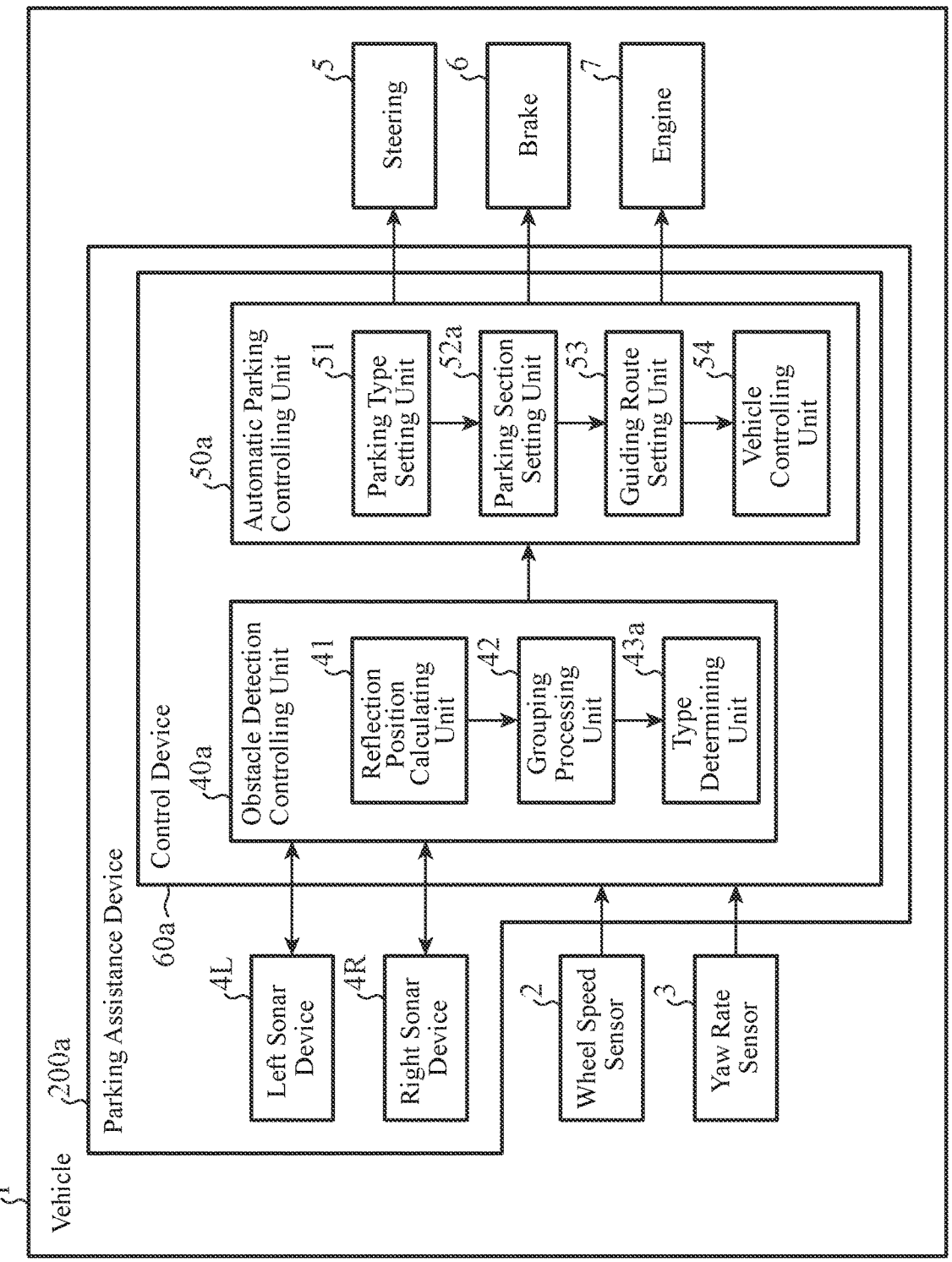
FIG. 20 is a functional block diagram illustrating a parking assistance device according to a third embodiment of the present invention mounted on a vehicle.

FIG. 20 is a functional block diagram illustrating a parking assistance device according to a third embodiment of the present invention mounted on a vehicle. With reference to FIG. 20, a parking assistance device 200a according to the third embodiment will be described. Note that in FIG. 20 the same symbol is given to a block similar to that in the functional block diagram of the second embodiment illustrated in FIG. 9, and descriptions thereof will be omitted.

Figure 21A:
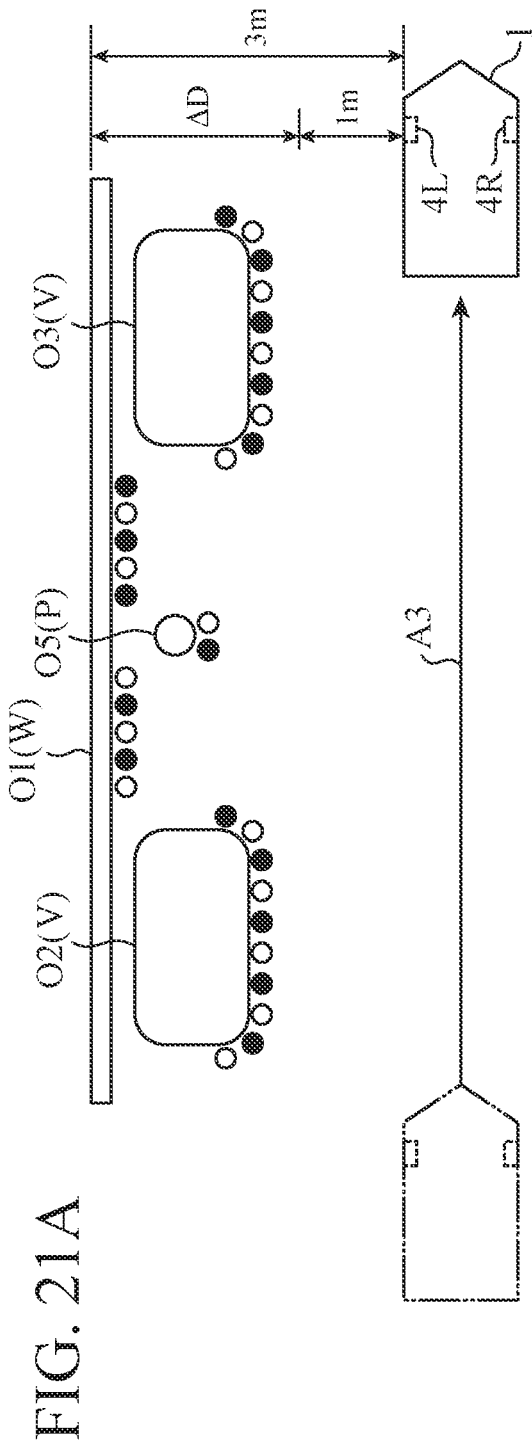
FIG. 21A is an explanatory diagram illustrating reflection positions calculated by a reflection position calculating unit according to the third embodiment of the present invention.
Figure 21B:
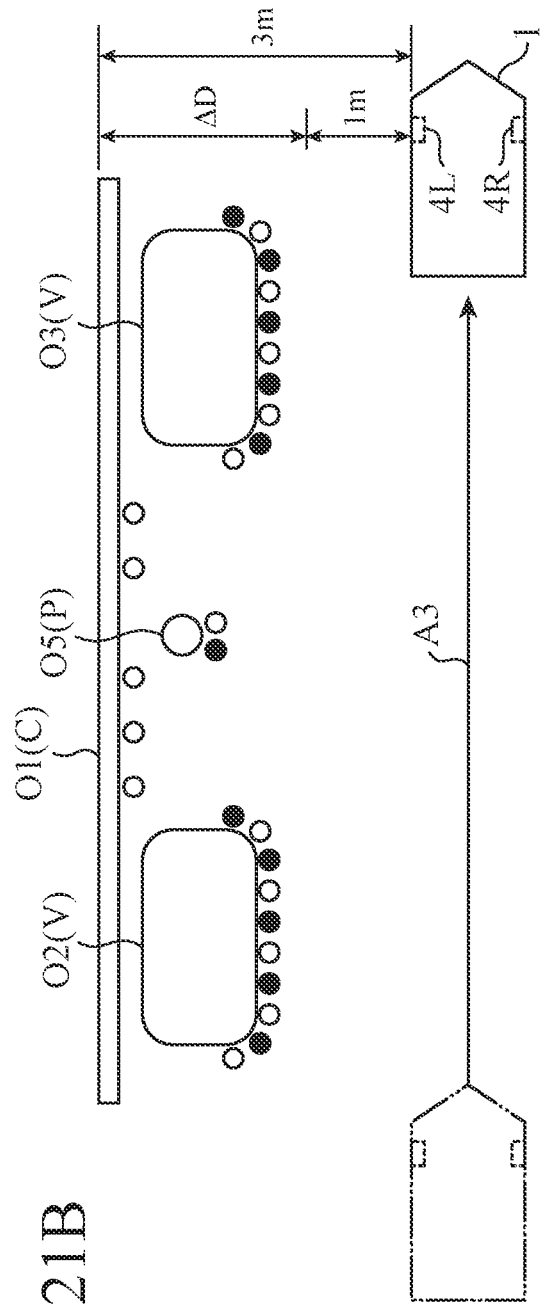
FIG. 21B is an explanatory diagram illustrating other reflection positions calculated by the reflection position calculating unit according to the third embodiment of the present invention.

A reflection position calculating unit 41 calculates a reflection position. FIG. 21 is a diagram illustrating an example of the reflection position calculated by the reflection position calculating unit 41. As illustrated in FIG. 21A, in a case where an obstacle O1 present in a determination target distance range ΔD is a wall W, first reflection positions and second reflection positions are alternately arranged along the obstacle O1. On the other hand, as illustrated in FIG. 21B, in a case where an obstacle O1 present within the determination target distance range ΔD is a curb C, only first reflection positions are arranged along the obstacle O1. That is, reflection positions corresponding to the obstacle O1 are similar to those described with reference to FIG. 4 in the first embodiment.

In addition, obstacles O2 and O3 present on a near side with respect to the obstacle O1 are other vehicles V As illustrated in FIG. 21, in a case where the obstacles O2 and O3 present within the determination target distance range ΔD are the other vehicles V, first reflection positions and second reflection positions are alternately arranged along the obstacles O2 and O3. That is, reflection positions corresponding to the obstacles O2 and O3 are similar to those described with reference to FIG. 10 in the second embodiment.

Here, an obstacle O5 present between the obstacles O2 and O3 is a pole P that cannot be crossed over. Generally, when an ultrasonic wave emitted by sonar device 4L or 4R is reflected by the pole P, a route of the ultrasonic wave runs along an orientation of the sonar device 4L or 4R, that is, a route similar to the arrow A1 illustrated in FIG. 2A. Therefore, when the pole P is present within the determination target distance range ΔD, a level value of the reflection wave reflected by the pole P is greater than or equal to the second threshold value Lth2 illustrated in FIG. 3. Therefore, reflection positions are calculated by both the first reflection position calculating processing and the second reflection position calculating processing. As a result, as illustrated in FIG. 21, first reflection positions and second reflection positions are alternately arranged along the obstacle O5.

A grouping processing unit 42 groups the reflection positions calculated by the reflection position calculating unit 41. FIG. 22 illustrates an example of groups set by the grouping processing unit 42. In the case where the reflection positions illustrated in FIG. 21A are grouped by the grouping processing unit 42, as illustrated in FIG. 22A, groups G1A and G1B corresponding to the obstacle O1, a group G2 corresponding to the obstacle O2, a group G3 corresponding to the obstacle O3, and a group G5 corresponding to the obstacle O5 are set. In the case where the reflection positions illustrated in FIG. 21B are grouped by the grouping processing unit 42, as illustrated in FIG. 22B, groups G1A and G1B corresponding to the obstacle O1, a group G2 corresponding to the obstacle O2, a group G3 corresponding to the obstacle O3, and a group G5 corresponding to the obstacle O5 are set.

Using the grouping result by the grouping processing unit 42, a type determining unit 43a determines the type of each of one or more obstacles (four obstacles O1 to O3 and O5 in the example of FIG. 21) present within the determination target distance range ΔD. Specifically, for example, the type determining unit 43a determines whether an obstacle corresponding to each of the groups is the pole P depending on the width of the group. Moreover, the type determining unit 43a determines whether an obstacle corresponding to each of the groups is the curb C, the wall W, or the other vehicles V depending on whether the group, excluding the group having been determined as the pole P, includes a second reflection position. Furthermore, the type determining unit 43a determines whether an obstacle corresponding to each of groups is the wall W, another vehicle V parallel parked, or another vehicle V perpendicularly parked depending on the shape of the group having been determined as the wall W or the other vehicles V. The type determining unit 43a determines whether an obstacle corresponding to each of the groups is the curb C, the wall W, another vehicle V parallel parked, another vehicle V perpendicularly parked, or the pole P from a combination of the determination result based on the width of the group, the determination result based on whether there is a second reflection position, and the determination result based on the shape of the group.

Hereinafter, a specific example of the determination method based on the width of a group will be described. First, the type determining unit 43a calculates the width of each of one or more groups set by the grouping processing unit 42. Specifically, for example, the type determining unit 43a calculates a width W1A of the group G1A, a width W1B of the group G1B, a width W2 of the group G2, a width W3 of the group G3, and a width W5 of the group G5 illustrated in FIG. 22.

Generally, the width of a group corresponding to the pole P is narrower than the width of groups corresponding to the curb C, the wall W, the other vehicle V parallel parked, and the other vehicle V perpendicularly parked. Also in the example of FIG. 22, the width W5 of the group G5 corresponding to the pole P is narrower than the widths W1A, W1B, W2, and W3 of the other groups G1A, G1B, G2, and G3.

In the type determining unit 43a, a threshold value (hereinafter referred to as "first width threshold value") which is larger than the width W5 of the group G5 corresponding to the pole P and smaller than the widths W1A, W1B, W2, and W3 of the other groups G1A, G1B, G2, and G3 is set in advance. The type determining unit 43a compares the calculated width of each of the groups with the first width threshold value. In the case where a calculated width is less than the first width threshold value, the type determining unit 43a determines that an obstacle corresponding to the group is the pole P and, in the case where the calculated width is greater than or equal to the first width threshold value, the type determining unit 43a determines that an obstacle corresponding to the group is not the pole P.

In FIG. 23, a table corresponding to the determination method based on the width of a group and whether there is a second reflection position is illustrated. In the figure, "small" indicates that a width of a group is less than the first width threshold value. "Large" indicates that a width of a group is greater than or equal to the first width threshold value.

Note that a specific example of the determination method based on the shape of a group is similar to that described with reference to FIGS. 12 and 13 in the second embodiment, and thus explanation thereof will be omitted. That is, as to an obstacle having been determined as the wall or the other vehicle V based on the table illustrated in FIG. 23, the type determining unit 43a determines whether the obstacle is the wall W, the other vehicle V parallel parked, or the other vehicle perpendicularly parked on the basis of one of the tables illustrated in FIGS. 24A to 24C.

A parking section setting unit 52a extracts a parkable section depending on the result of grouping by the grouping processing unit 42, the result of determination by the type determining unit 43a, and the parking type set by the parking type setting unit 51. The parking section setting unit 52a further sets the extracted parkable section as a parking target section.

Specifically, for example in the case where the parking type is set to parallel parking, the parking section setting unit 52a extracts, as a parkable section, a section where no obstacle such as the other vehicle V or the pole P is present over a distance range larger than the entire length of the vehicle 1. Similarly, for example in the case where the parking type is set to double parking, the parking section setting unit 52a extracts, as a parkable section, a section where no obstacle such as the other vehicle V or the pole P is present over a distance range larger than the vehicle width of the vehicle 1. The parking section setting unit 52a sets the extracted parkable section as a parking target section.

An obstacle detection controlling unit 40a is configured by the reflection position calculating unit 41, the grouping processing unit 42, and the type determining unit 43a. An automatic parking controlling unit 50a is configured by the parking type setting unit 51, the parking section setting unit 52a, the guiding route setting unit 53, and the vehicle controlling unit 54. The main part of a control device 60a is configured by the obstacle detection controlling unit 40a and the automatic parking controlling unit 50a. The parking assistance device 200a is configured by the sonar devices 4L and 4R and the control device 60a.

Since a hardware configuration of the main part of the control device 60a is similar to that described with reference to FIG. 7 in the first embodiment, illustration and description thereof are omitted.

Since the operation of the control device 60a is similar to that described with reference to the flowchart of FIG. 16 in the second embodiment, illustration and description thereof are omitted. Note that in step ST13, the type determining unit 43a determines which of the curb C, the wall W, the other vehicle V parallel parked, the other vehicle V perpendicularly parked, and the pole P is an obstacle corresponding to each of the groups in accordance with the table illustrated in FIG. 23 and one of the tables illustrated in FIGS. 24A to 24C. Furthermore, in step ST15, in the case where the parking type is set to parallel parking, the parking section setting unit 52a extracts, as a parkable section, a section where no obstacle such as the other vehicle V or the pole P is present over a distance range larger than the entire length of the vehicle 1. Alternatively, in the case where the parking type is set to double parking, the parking section setting unit 52a extracts, as a parkable section, a section where no obstacle such as the other vehicle V or the pole P is present over a distance range larger than the vehicle width of the vehicle 1.

Note that, when determining the type of obstacle based on the width of a group, the type determining unit 43a may compare the width of a part of each group with a threshold value instead of the entire width of each group as illustrated in FIG. 22. Specifically, for example as illustrated in FIG. 25, the type determining unit 43a calculates the widths W1A', W1B', W2', W3', and W5' of linear parts of the groups G1A, G1B, G2, G3, and G5. In the type determining unit 43a, a threshold value which is larger than the width W5' of the linear part of the group G5 corresponding to the pole P and smaller than the widths W1A', W1B', W2', and W3' of the linear parts of the other groups G1A, G1B, G2, and G3 is set in advance. The type determining unit 43a compares the width of a linear part of each of the groups with the threshold value and thereby determines whether an obstacle corresponding to the group is the pole P.

Moreover, the type determining unit 43a may determine whether an obstacle corresponding to each of the groups is another vehicle V parallel parked, or another vehicle V perpendicularly parked depending on the width of the group instead of the shape of the group.

That is, in general, the width of a group corresponding to the other vehicle V perpendicularly parked is narrower than the width of a group corresponding to the other vehicle V parallel parked. In the type determining unit 43a, a threshold value (hereinafter referred to as "second width threshold value") which is larger than the width of a group corresponding to the other vehicle V perpendicularly parked and smaller than the width of a group corresponding to the other vehicle V parallel parked is set in advance in addition to the first width threshold value. First, the type determining unit 43a compares the width of each of the groups with the first width threshold value and thereby determines whether an obstacle corresponding to the group is the pole P. Next, for each of the groups excluding the group having been determined as the pole P, the type determining unit 43a determines whether an obstacle corresponding to the group is the curb C, the wall W or the other vehicles V by the determination method based on whether there is a second reflection position and on the shape of the group. Next, as to groups having been determined as the other vehicles V, the type determining unit 43a compares the width of each of the groups with the second width threshold value and thereby determines whether an obstacle corresponding to the group is another vehicle V parallel parked or another vehicle V perpendicularly parked.

In addition, the parking assistance device 200a can adopt various modifications similar to those described in the first or second embodiment. For example, the reflection position calculating unit 41 may calculate low reflection positions and high reflection positions instead of first reflection positions and second reflection positions. Instead of determining whether a second reflection position is included in each group, the type determining unit 43a may determine the type of the obstacle corresponding to the group depending on whether reflection positions included in each group are low reflection positions or high reflection positions.

As described above, in the parking assistance device 200a according to the third embodiment, the obstacle detection controlling unit 40a determines whether obstacles O1 to O3 and O5 are poles P depending on the widths W1A, W1B, W2, W3, and W5 of the groups G1A, G1B, G2, G3, and G5. Detection of the pole P by the obstacle detection controlling unit 40a allows the automatic parking controlling unit 50a to exclude a section in which the pole P is present from the parking target section or to set a guiding route that avoids the vehicle 1 from coming into contact with the pole P.

Note that, within the scope of the present invention, the present invention may include a flexible combination of the respective embodiments, a modification of any component of the respective embodiments, or an omission of any component in the respective embodiments.

INDUSTRIAL APPLICABILITY

A parking assistance device of the present invention can be used for automatic parking in the form of parallel parking, for example.

REFERENCE SIGNS LIST

1: Vehicle, 2: Wheel speed sensor, 3: Yaw rate sensor, 4L: Left sonar device, 4R: Right sonar device, 5: Steering, 6: Brake, 7: Engine, 10: Obstacle detection controlling unit, 11: Reflection position calculating unit, 12: Type determining unit, 20: Automatic parking controlling unit, 21: Guiding route setting unit, 22: Vehicle controlling unit, 30: Control device, 31: Memory, 32: Processor, 33: Processing circuit, 40, 40a: Obstacle detection controlling unit, 41: Reflection position calculating unit, 42: Grouping processing unit, 43, 43a: Type determining unit, 50, 50a: Automatic parking controlling unit, 51: Parking type setting unit, 52, 52a: Parking section setting unit, 53: Guiding route setting unit, 54: Vehicle controlling unit, 60, 60a: Control device, 100: Parking assistance device, 200, 200a: Parking assistance device

The invention claimed is:
1. A parking assistance device comprising:
a pair of left and right sonar devices provided in a vehicle;
an obstacle detection controller configured to
calculate at least one first reflection position when a level value of a reflection wave received by one of the sonar devices is equal to or greater than a first threshold value,
calculate at least one second reflection position when the level value of the reflection wave received by one of the sonar devices is equal to or greater than a second threshold value being higher than the first threshold value,
set the at least one first reflection position and the at least one second reflection position that have been calculated, in an identical group when a distance between a plurality of reflection positions adjacent to each other indicates a value less than or equal to a predetermined value,
determine that an obstacle present within a determination target distance range on a side of the vehicle is a curb when the at least one second reflection position is not included in the reflection positions having been grouped,
determine that the obstacle present within the determination target distance range on the side of the vehicle is a wall when the at least one second reflection position is included in the reflection positions having been grouped and when a value for indicating variations in a direction indicated by normal vectors of the reflection positions having been grouped is less than a distribution threshold value,
determine that the obstacle present within the determination target distance range on the side of the vehicle is a parked vehicle when the at least one second reflection position is included in the reflection positions having been grouped and when the value for indicating variations in the direction indicated by the normal vectors of the reflection positions having been grouped is equal to or greater than the distribution threshold value; and an automatic parking controller configured to set a guiding route for automatic parking depending on a determination result by the obstacle detection controller, wherein the automatic parking controller calculates a parking area at least in a form of parallel parking in accordance with a position of the curb, the wall, or the parked vehicle determined by the obstacle detection controller, and when the obstacle adjacent to the parking area indicates the curb, the automatic parking controller sets the guiding route requiring a greater amount of steering of the vehicle, with respect to a case where the obstacle adjacent to the parking area indicates the wall.

2. The parking assistance device according to claim 1, wherein the obstacle detection controller determines whether the obstacle is a pole depending on a width of the group.

3. The parking assistance device according to claim 1, wherein the automatic parking controller sets the guiding route for parallel parking or the guiding route for double parking depending on a result of the grouping.

\* \* \* \* \*